(12) United States Patent
Sorensen

(10) Patent No.: US 7,606,728 B2
(45) Date of Patent: Oct. 20, 2009

(54) SHOPPING ENVIRONMENT ANALYSIS SYSTEM AND METHOD WITH NORMALIZATION

(75) Inventor: Herb Sorensen, Corbett, OR (US)

(73) Assignee: Sorensen Associates Inc., Troutdale, OR (US)

( * ) Notice: Subject to any disclaimer, the term of this patent is extended or adjusted under 35 U.S.C. 154(b) by 1103 days.

(21) Appl. No.: 10/667,213

(22) Filed: Sep. 19, 2003

(65) Prior Publication Data

US 2004/0111454 A1 Jun. 10, 2004

Related U.S. Application Data

(60) Provisional application No. 60/412,389, filed on Sep. 20, 2002.

(51) Int. Cl.
G06F 17/30 (2006.01)
G07G 1/00 (2006.01)

(52) U.S. Cl. .............................. 705/10; 705/26; 705/27
(58) Field of Classification Search ....................... None
See application file for complete search history.

(56) References Cited

U.S. PATENT DOCUMENTS

| | | | | |
|---|---|---|---|---|
| 5,729,697 | A * | 3/1998 | Schkolnick et al. | 705/23 |
| 5,920,287 | A * | 7/1999 | Belcher et al. | 342/450 |
| 6,513,015 | B2 * | 1/2003 | Ogasawara | 705/26 |
| 6,563,423 | B2 * | 5/2003 | Smith | 340/572.1 |
| 6,574,549 | B2 * | 6/2003 | Cato et al. | 701/200 |
| 6,718,341 | B1 * | 4/2004 | Berstis et al. | 707/104.1 |
| 7,006,982 | B2 * | 2/2006 | Sorensen | 705/10 |
| 7,076,441 | B2 * | 7/2006 | Hind et al. | 705/10 |
| 2002/0161651 | A1 * | 10/2002 | Godsey et al. | 705/22 |
| 2002/0178085 | A1 * | 11/2002 | Sorensen | 705/26 |

FOREIGN PATENT DOCUMENTS

CA 2390456 * 3/2001 ..................... 17/60

OTHER PUBLICATIONS

WhereNet to Assist Supermarkets and Consumer Goods Manufacturers With Analysis Of Customer Buying Habits. (Apr. 2). PR Newswire,1. Retrieved Feb. 9, 2008, from Business Dateline database. (Document ID: 112707870).*

"Knowledge At Wharton." Wharton.Upenn.Edu. Jun. 1, 2005. University of Pennsylvania. Feb. 9, 2008 <http://knowledge.wharton.upenn.edu/articlepdf/1208.pdf?CFID=61086410&CFTOKEN=34222128&jsessionid=9a30587547902ce49705>.*

Farley, J. U., & Ring, L. W. (1966). A Stochastic Model of Supermarket Traffic Flow. Operations Research, 14(4), 555-567.*

(Continued)

*Primary Examiner*—Beth V Boswell
*Assistant Examiner*—Folashade Anderson
(74) *Attorney, Agent, or Firm*—Alleman Hall McCoy Russell & Tuttle LLP

(57) ABSTRACT

A system and method are provided for analyzing a shopping environment. The method typically includes tracking a plurality of paths of a plurality of persons in the shopping environment, and recording corresponding path data. The method further may include normalizing path data for each path by use of a predetermined normalization function, and calculating a predetermined statistical measure of the normalized shopping data. The method also may include producing output based upon the predetermined statistical measure.

43 Claims, 14 Drawing Sheets

OTHER PUBLICATIONS

Heller, Walter (1988), "Tracking Shoppers Through the Combination Store," Progressive Grocer, 47-64.*

Enviosell.com (Apr. 2001), Internet Achive http://www.archive.org/web/web.php.*

Juliet Schor (Jul. 4, 1999). The selling of selling Why do we buy what and when we do? Paco Underhill's got it all figured out :[City Edition]. Boston Globe, p. F1. Retrieved Feb. 19, 2008, from Business Dateline database. (Document ID: 43082175).*

Ephraim Schwartz (Apr. 2, 2002). Tracking Technology Sheds Light on Shopping Habits. InfoWorld, Retrieved Jan. 13, 2008 from www.infoworld.com.*

Bill Epmeier A 'racetrack:' would it work for supermarkets?, published Apr. 2001.*

* cited by examiner

Shopper Paths - Conventional Configuration

Shopper Paths - Drive Aisle Configuration

|  |  | CHECKOUT | STRIP SHOPPING | | MALL SHOPPING | |
|---|---|---|---|---|---|---|
|  |  |  | CONVENTIONAL | DRIVE AISLE | CONVENTIONAL | DRIVE AISLE |
|  |  | ALL STORES | STORE 1 | STORE 2 | STORE 3 | STORE 4 |
|  | N = | 2000 | 500 | 500 | 500 | 500 |
|  |  | VISITS | | | | |
| FRONT | 1 | 100% | 100% | 100% | 100% | 100% |
| RIGHT | 2 | XX% | XX% | XX% | XX% | XX% |
| BACK | 3 | XX% | XX% | XX% | XX% | XX% |
| LEFT | 4 | XX% | XX% | XX% | XX% | XX% |
| CENTER | 5 | XX% | XX% | XX% | XX% | XX% |
|  |  | SHOPPING | | | | |
| FRONT | 1 | XX% | XX% | XX% | XX% | XX% |
| RIGHT | 2 | XX% | XX% | XX% | XX% | XX% |
| BACK | 3 | XX% | XX% | XX% | XX% | XX% |
| LEFT | 4 | XX% | XX% | XX% | XX% | XX% |
| CENTER | 5 | XX% | XX% | XX% | XX% | XX% |
|  |  | PURCHASES | | | | |
| FRONT | 1 | XX% | XX% | XX% | XX% | XX% |
| RIGHT | 2 | XX% | XX% | XX% | XX% | XX% |
| BACK | 3 | XX% | XX% | XX% | XX% | XX% |
| LEFT | 4 | XX% | XX% | XX% | XX% | XX% |
| CENTER | 5 | XX% | XX% | XX% | XX% | XX% |

FIG. 16

SHOPPING ENVIRONMENT ANALYSIS SYSTEM AND METHOD WITH NORMALIZATION

CROSS-REFERENCE TO RELATED APPLICATIONS

This application claims priority under 35 U.S.C. §119 to U.S. provisional patent application Ser. No. 60/412,389, entitled "SHOPPING ENVIRONMENT ANALYSIS SYSTEM AND METHOD," filed on Sep. 20, 2002, the entire disclosure of which is herein incorporated by reference. This application also claims priority under 35 U.S.C. §120 to U.S. patent application Ser. No. 10/115,186, entitled "PURCHASE SELECTION BEHAVIOR ANALYSIS SYSTEM AND METHOD," filed on Apr. 1, 2002, which in turn claims priority under 35 U.S.C. §119 to U.S. provisional patent application Ser. No. 60/291,747, entitled "PURCHASE SELECTION BEHAVIOR ANALYSIS SYSTEM BASED ON LINKED PURCHASE RECORDS AND SHOPPING PATH CHARACTERISTICS," filed on May 15, 2001, and to U.S. provisional patent application Ser. No. 60/291,746, entitled "CONSTRAINED STATISTICALLY ENHANCED LOCATION AND PATH ANALYSIS SYSTEM," filed on May 15, 2001. The entire disclosure of each of these applications is herein incorporated by reference.

FIELD OF THE INVENTION

The present invention relates generally to a shopping environment analysis system and method, and more particularly to a shopping environment analysis system and method that utilizes normalization.

BACKGROUND

Retailers face a challenge when trying to tailor their physical shopping environments to better suit the needs and desires of shoppers. In the past, collection and analysis of data on shopper behavior within shopping environments have been problematic. Prior art methods involving physically counting and tracking customers using observers placed at various locations throughout the store have proved costly, ineffective, and error-prone. Prior art systems that featured automated tracking systems suffered from the drawback that they did not offer the retailer meaningful analysis of the collected data, and provided no ability to compare data from different retail environments.

For the foregoing reasons, there is a need for a shopping environment analysis system and method that assists retailers in molding their shopping environment to meet users' needs and maximize the return on investment.

SUMMARY

A system and method are provided for analyzing a shopping environment. The method typically includes tracking a plurality of paths of a plurality of persons in the shopping environment, and recording corresponding path data. The method further may include normalizing path data for each path by use of a predetermined normalization function, and calculating a predetermined statistical measure of the normalized shopping data. The method also may include producing output based upon the predetermined statistical measure.

BRIEF DESCRIPTION OF THE DRAWINGS

FIG. 16 is a table showing statistics for visiting, shopping, and purchasing products, calculated using the standardized shopping environment of FIG. 14.

DETAILED DESCRIPTION

Figure 1:
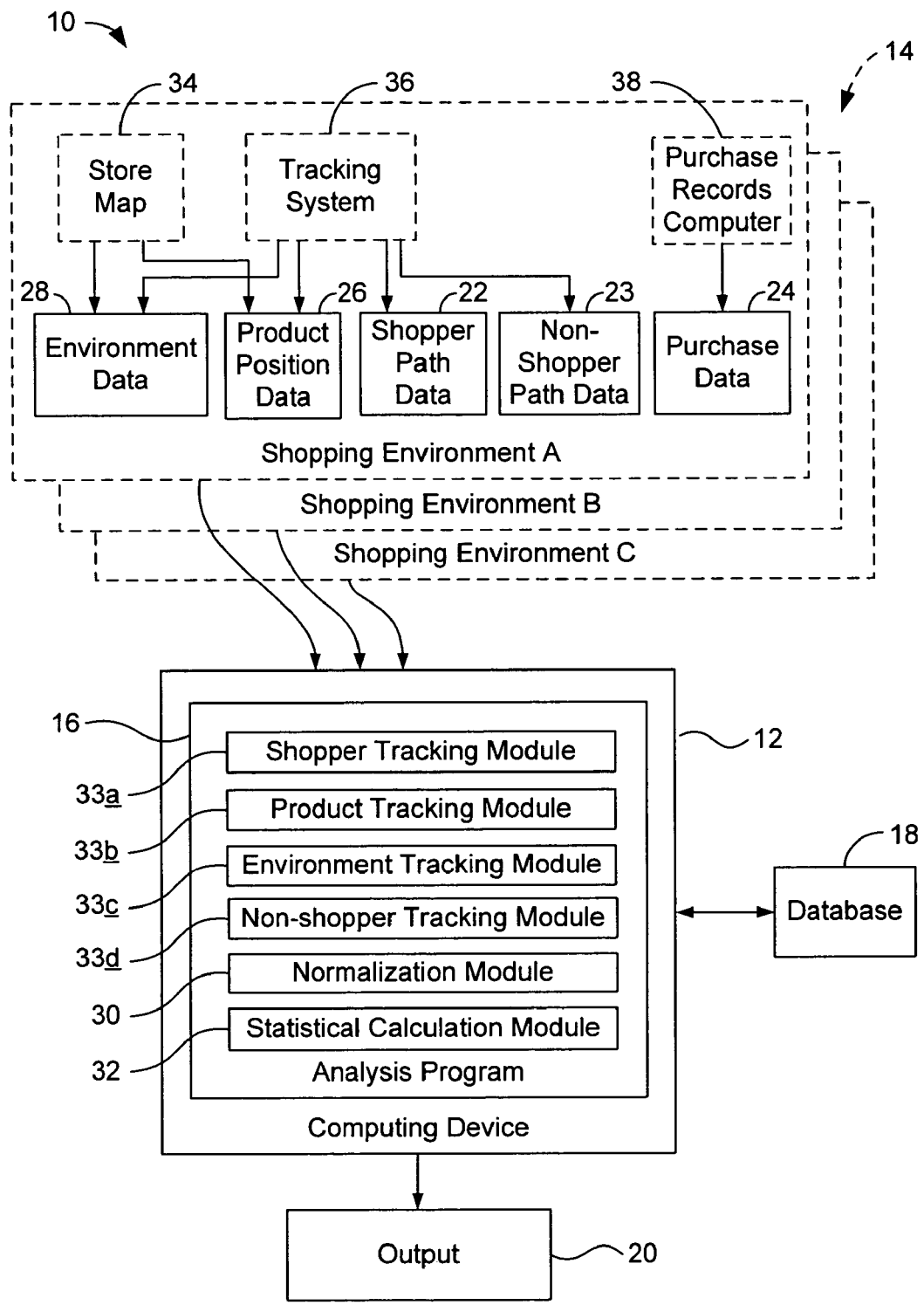
FIG. 1 is a schematic view of a system for analyzing shopping behavior of shoppers in a shopping environment, according to one embodiment of the present invention.

Referring now to FIG. 1, a shopping analysis system according to one embodiment of the present invention is shown generally at 10. System 10 typically includes a computing device 12 configured to receive data from a plurality of shopping environments 14, and execute an analysis program 16 configured to analyze and store the data in database 18, and produce output 20. Computing device 12 is also configured to retrieve stored data from database 18. Typically, the data received from the shopping environments includes shopper path data 22, non-shopper path data 23, purchase data 24, product position data 26, and environment data 28. Analysis program 16 includes a shopper tracking module 33*a*, product tracking module 33*b*, environment tracking module 33*c*, and non-shopper path tracking module 33*d*, which process the data to resolve physical locations of the shoppers, non-shoppers (e.g., staff), products, and movable environmental elements within the shopping environment, and also includes a normalization module 30 and statistical calculation module 32, which process the data to produce useful comparisons and statistics for the user, as described in detail below. While a plurality of shopping environments are shown, it will be appreciated that many aspects of the present invention may be practiced even when the shopping environment analysis system includes only a single shopping environment rather than a plurality of shopping environments.

Each shopping environment 14 typically has an associated store map 34, tracking system 36, and purchase records computer 38. Store map 34 physically describes the store environment, and includes information such as store dimensions, locations of doors, aisles, shelving, displays and kiosks, and checkout registers. The store map also typically includes information on the position of products within the shopping environment. Store map 34 typically is created in electronic form, and is stored in computer memory and/or on storage media.

Figure 3:
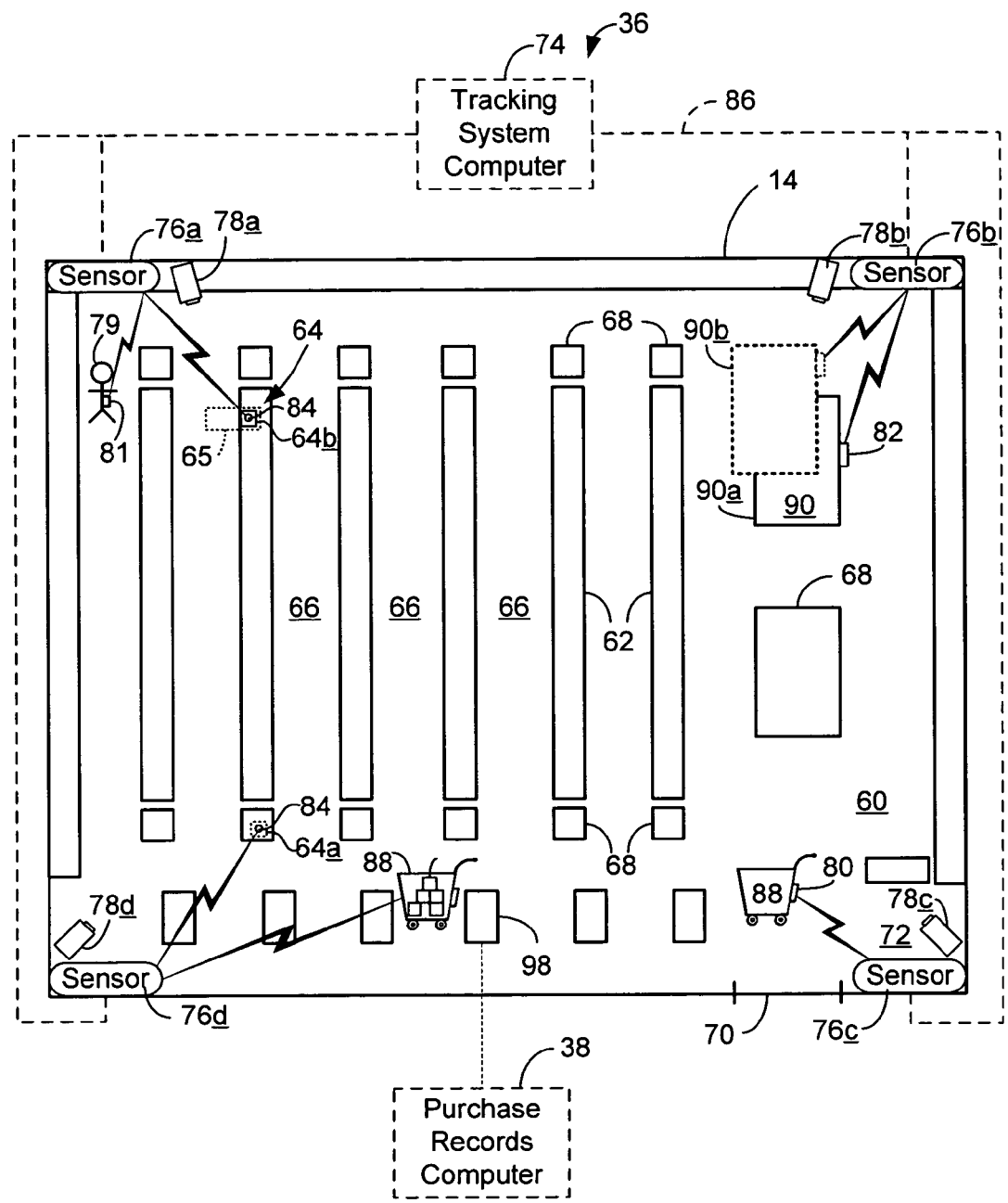
FIG. 3 is a schematic view of a shopping environment analyzed by the system of FIG. 1.

Tracking system 36 is configured to track the position of a shopper or non-shopper and generate shopper path data 22 and non-shopper path data 23, as explained in more detail with respect to FIG. 3. Purchase records computer 38 is configured to record purchase data 24 from point of sale registers within the shopping environment. The analysis program 16 is configured to link the purchase data 24 with the shopper path data 22 to identify those purchase records that correspond with each shopper path. Tracking system 36 is further configured to track the location of movable environment elements (referred to herein as "movable fixtures") as well as products throughout the shopping environment, and generate environment data 28 and product position data 26 to complement the data derived from store map 34.

Output 20 may include data compilations or reports, tabulations, graphs, plots overlaid on store map 34, and other forms of presentation to facilitate interpretation of the results of the analysis. Output 20 includes printouts as well as recording on CD-ROM or other forms of volatile or non-volatile computer memory or media. Output 20 may also be formatted as web pages to be rendered by a browser.

Figure 2:
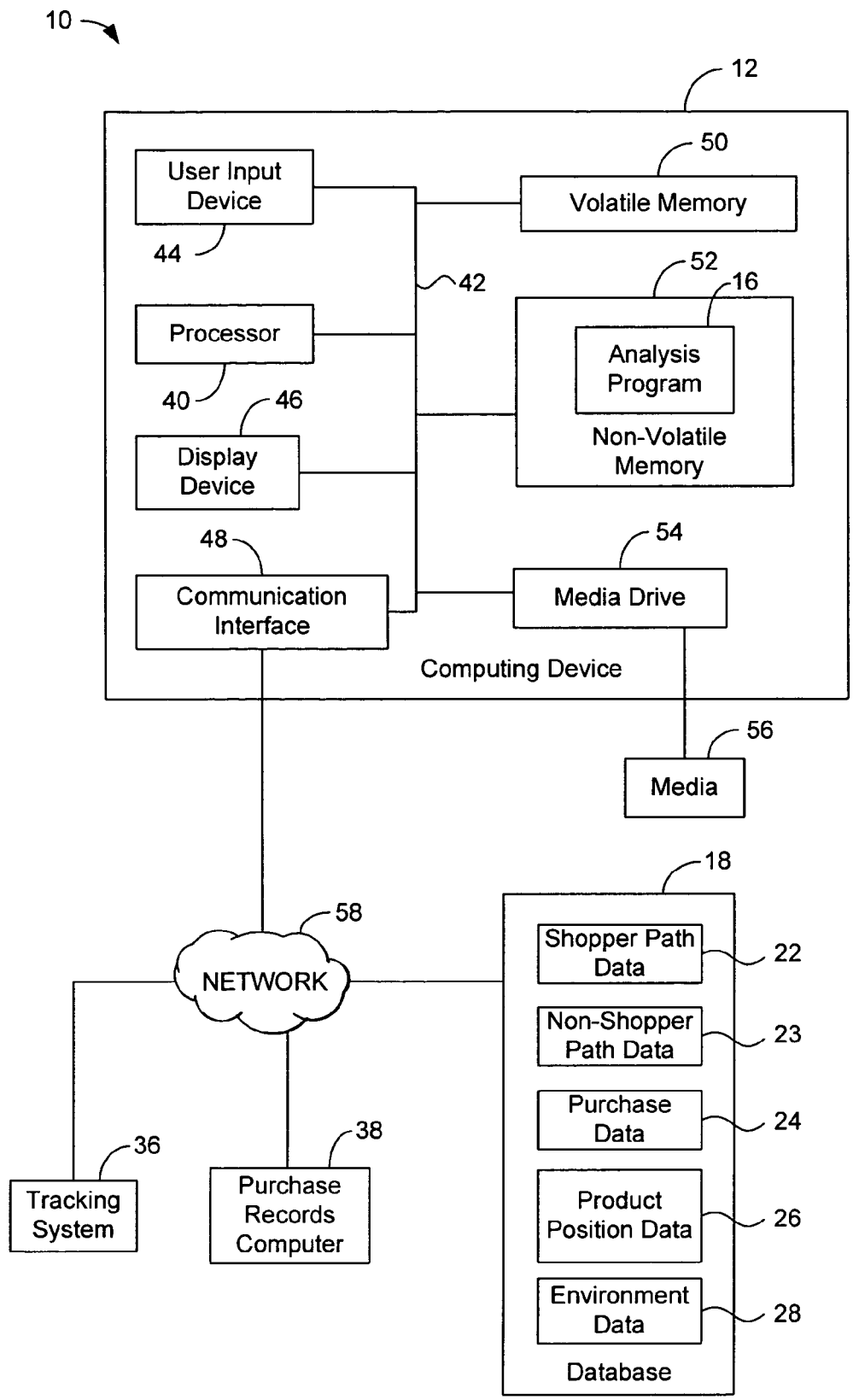
FIG. 2 is a schematic view of a computing device and database of the system of FIG. 1.

As shown in FIG. 2, computing device 12 typically includes a processor 40 linked by a communications bus 42 to a user input device 44 (e.g. keyboard), display device 46, communication interface 48 (e.g. network card), volatile memory 50 (e.g. RAM), non-volatile memory 52 (e.g. hard drive, ROM, etc.), and a media drive 54 configured to read corresponding media 56 (e.g. CD ROM, DVD-ROM). Processor 40 is configured to execute analysis program 16 using portions of volatile memory 50 and non-volatile memory 52. Communication interface 48 is typically configured to connect to computer network 58 to establish respective communications links with tracking system 36, purchase records computer 38, and database 18. Shopper path data 22, non-shopper path data 23, purchase data 24, product position data 26, and environment data 28, gathered from tracking system 36 and from purchase records computer 38, may be stored in database 18, or alternatively at some other location accessible to computing device 12.

Referring now to FIG. 3, a schematic representation of shopping environment 14 is shown. Shopping environment 14 typically includes a selling floor 60 configured with shelves 62 that carry products 64, and partition the floor into aisles 66. Shopping environment 14 may also include displays 68 positioned at various locations on the shopping floor. Shopping environment 14 also typically includes an entrance/exit 70, and a cart return area 72.

Figure 5:
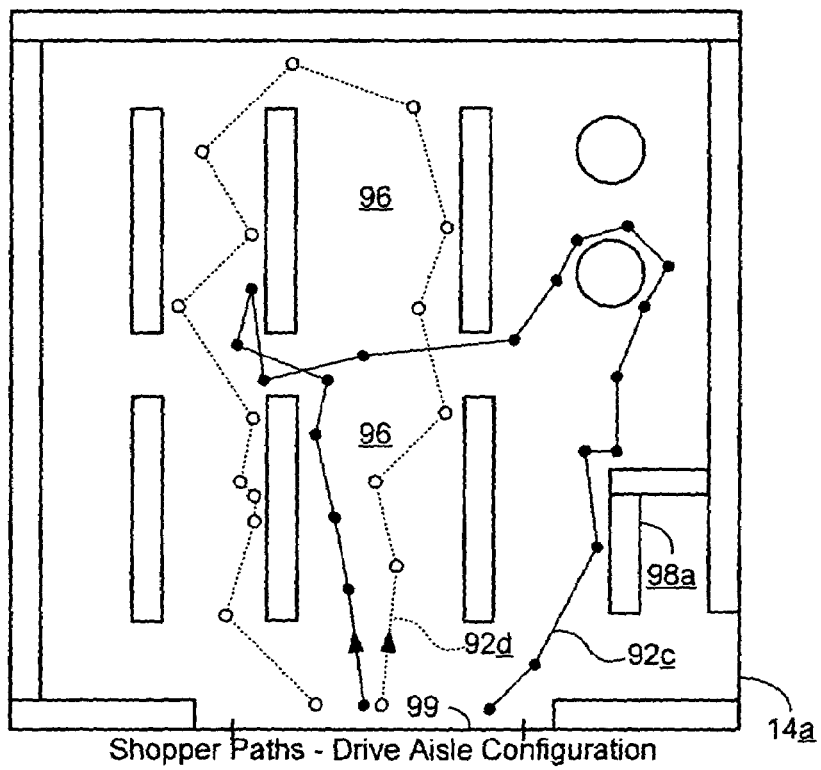
FIG. 5 is a schematic view of another shopping environment analyzed by the system of FIG. 1.

Shopping environment 14 may be located in a variety of locations, such as within a mall or a so-called "strip mall," or as a stand-alone store. The configuration of shopping environment 14 shown in FIG. 3 is referred to as a "conventional" configuration herein, meaning that it has a large outer "racetrack" aisle encircling several inner aisles of approximately equal width, and point of sale checkout registers that are positioned in between the aisles and the front of the store, often separating the entrance from the aisles. FIG. 5, by contrast, shows a shopping environment 14*a* that will be referred to herein as having a "drive aisle" configuration, since it includes a large front entrance that opens up directly to a center drive aisle 96 that is typically wider than other aisles in the store, with a checkout register that is positioned on a side of the shopping environment.

Returning to FIG. 3, tracking system 36 associated with shopping environment 14 typically includes a tracking system computer 74 and a plurality of tracking sensors 76*a*-76*d* configured to track the position of shopper tag 80, non-shopper tag 81, environment tag 82, and product tag 84 within shopping environment 14. Sensors 76*a*-76*d* are configured to communicate signals to tracking system computer 74, via a communication link 86, which may be wired or wireless. Tracking system computer 74 is typically configured to analyze these signals and produce position data representing the path taken by the tags 80, 81, 82, and 84 throughout the shopping environment 14. Alternatively, it will be appreciated that cameras 78*a*-78*d* may be used instead of, or in addition to, sensors 76*a*-76*d*, and the shopper and non-shopper paths may be wholly or partially generated based on video or still images collected from these cameras. Typically, tracking system computer 74, purchase records computer 38, and computing device 12 (FIG. 2) are separate devices, however, it will be appreciated that the functions of one or more of these devices may be combined in a single device.

Shopper tags 80 are typically placed on shopper carts 88, which may be hand held carts, push-type carts, etc., but may alternatively be placed on another type of shopper surrogate. Non-shopper tags 81 are typically placed on a non-shopper 79 (e.g. staff member) and are surrogates that are worn voluntarily, such as name tags, uniforms, etc. Product tags 84 are typically attached to products 64 themselves, or to packaging, tags, or labels associated with the product. Product tags 84 may also be placed adjacent the products, to indicate product position. In addition or alternatively to automatic tracking, product position data 26 may be gathered manually. For example, the data may be obtained either from a planogram (a map of product positions in the store), or, where no planogram is used, by a manual audit of the store. Furthermore, where product position data 26 is gathered manually, data regarding changes in the product position may be obtained by periodic examinations of the planogram or periodic audits, or by automatic tracking. By way of example, the present system may be used to track a change in aisle locations of hot cocoa from a prominent position 64a near the front of the store in the winter season, to a central aisle position 64b in the summer season.

A predetermined product region 65 is typically defined adjacent each product, and analysis program 16 is configured to analyze the shopper paths to determine whether a predetermined shopping behavior is exhibited within the shopping path. For example, the analysis program is typically configured to detect whether a shopping path visits (i.e., passes through) the predetermined product region, shops (i.e., slows below a predetermined threshold speed or velocity), or purchases a product in the predetermined region. These and other shopping behaviors configured to be detected by the analysis program are more fully described in co-pending U.S. patent application Ser. No. 10/115,186, entitled "PURCHASE SELECTION BEHAVIOR ANALYSIS SYSTEM AND METHOD" filed on Apr. 1, 2002, the disclosure of which is herein incorporated by reference.

Environment tags 82 are typically placed on movable fixtures 90 within the shopping environment, such as displays, shelving, advertisements, tables, benches, stands, etc., which may be moved from a first position 90a to a second position 90b. As used herein, the term "fixture" is not limited to items that become a semi-permanent part of shopping environment when installed, but are meant to encompass even temporary items that may be moved throughout the shopping environment on a semi-regular basis. In addition, the term is meant to encompass large items such as refrigerators, shelving, and other more permanent fixtures that nonetheless are occasionally moved within a store environment.

Tags 80-84 are typically radio frequency identity tags configured to emit a tracking signal containing a unique transmitter identifier. Each radio frequency tag itself may also include a receiver configured to receive position information transmitted from tracking system 36, and may be outfitted with memory configured to store a position history for each tag. Typically the tags transmit the tracking signal at periodic intervals, such as every 4 seconds. Of course, virtually any other time interval suitable for tracking a shopper, including continuously, may alternatively be used. In addition, it will be appreciated that other types of suitable tags may be used to track shoppers, products, and movable fixtures, such as infrared emitters, etc.

It will be appreciated that tracking sensors 76a-76d and cameras 78a-78d are typically located at the perimeter of shopping environment 14, but alternatively may be located in any suitable position to monitor tracking signals from tags 80-84, including other positions in the store or even outside shopping environment 14.

According to one embodiment of the invention, the shoppers and non-shoppers may be tracked by an infrared tracking system configured to detect and track the body heat of each person. According to this embodiment, cameras 78a-78d are typically configured to detect infrared signals, and are positioned throughout the store. Various other systems and methods for tracking and analyzing shoppers are described in the above referenced co-pending U.S. patent applications, which are incorporated herein by reference.

Figure 4:
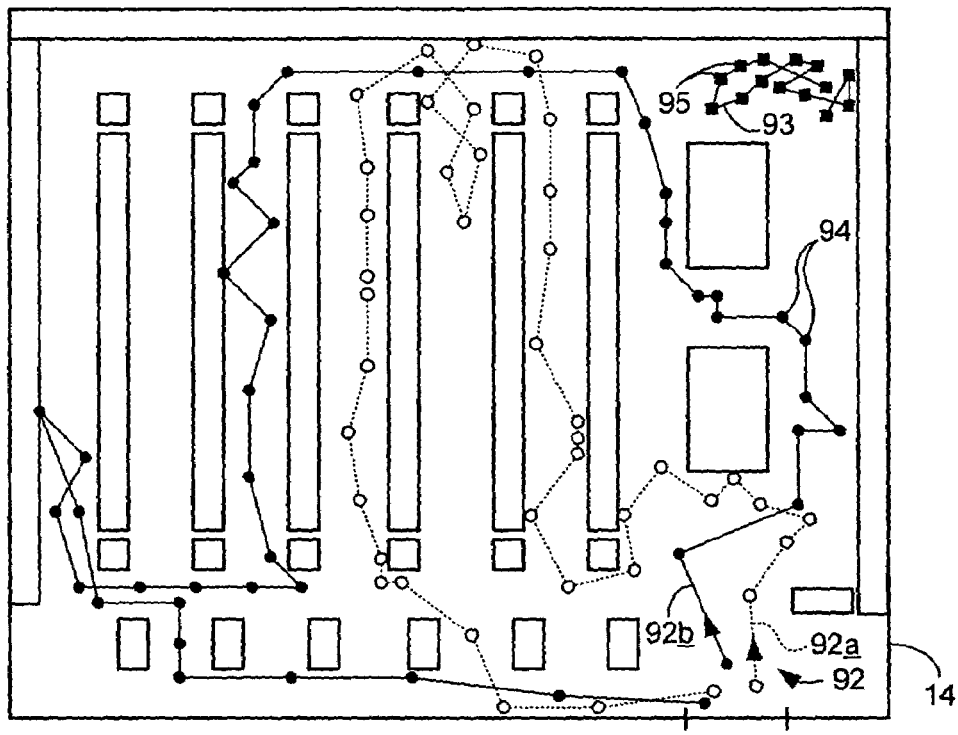
FIG. 4 is a schematic view of the shopping environment of FIG. 3, shown with tracked shopper paths superimposed thereon.

FIG. 4 shows exemplary shopper paths 92 and non-shopper paths 93 tracked by tracking system 36 (FIG. 3), within shopping environment 14. Shopper path 92a traverses only one aisle, while shopper path 92b traverses two aisles, and half-traverses a third. FIG. 5 shows exemplary shopper paths 92 tracked by tracking system 36 (FIG. 3) in shopping environment 14a, which includes a drive aisle 96. Path 92c enters entrance 99, heads half way up the drive aisle 96, and travels to a checkout register 98a to make a purchase, before leaving. Path 92d travels up the drive aisle 96, only to circle back through a side aisle and leave through entrance 99. Systems and methods for recognizing patterns in the paths are described in the above referenced co-pending U.S. patent applications, which have been incorporated by reference.

Tracking system 36 is typically configured to reconstruct each of shopping paths 92 by analyzing a plurality of detected tracking signals from a shopper tag 80 over time, and calculating a series of positions 94 of shopper tag 80 throughout shopping environment 14. Similarly, non-shopper path 93 is reconstructed from a series of positions 95 calculated based on signals tracked from non-shopper tag 81 on non-shopper 79. It will be appreciated that similar paths for products and movable fixtures may be generated, by tracking tags 82, 84.

Typically tracking system 36 is configured to determine that a shopper path has started when motion of a particular shopping tag is detected near the cart return area near the entrance of the shopping environment. To determine where one shopping path ends, tracking system 36 is typically configured to detect whether the position of the shopping tag is adjacent point of sale terminal 98 associated with purchase record computer 38, indicating that the shopper is at the checkout counter, purchasing items. Alternatively, the cart may have a barcode or tag that can be scanned by the point of sale terminal or other scanner to link the shopper path and the purchase record. In addition, it will be appreciated that raw position data may be forwarded to computing device 12, which in turn may be configured to detect where one shopping path begins and another ends.

Each shopper path 92 and non-shopper path 93 is typically reconstructed by tracking system computer 74 (or alternatively by computing device 12) by connecting the series of positions. The resultant polygonal line may be smoothed. Suitable methods in addition to those described herein for use in reconstructing the shopping path around, for example, barriers in the shopping environment, are described in co-pending U.S. provisional patent application Ser. No. 60/291, 746, filed May 15, 2001, entitled "Constrained Statistically Enhanced Location and Path Analysis System," the entire disclosure of which is herein incorporated by reference.

Figure 6:
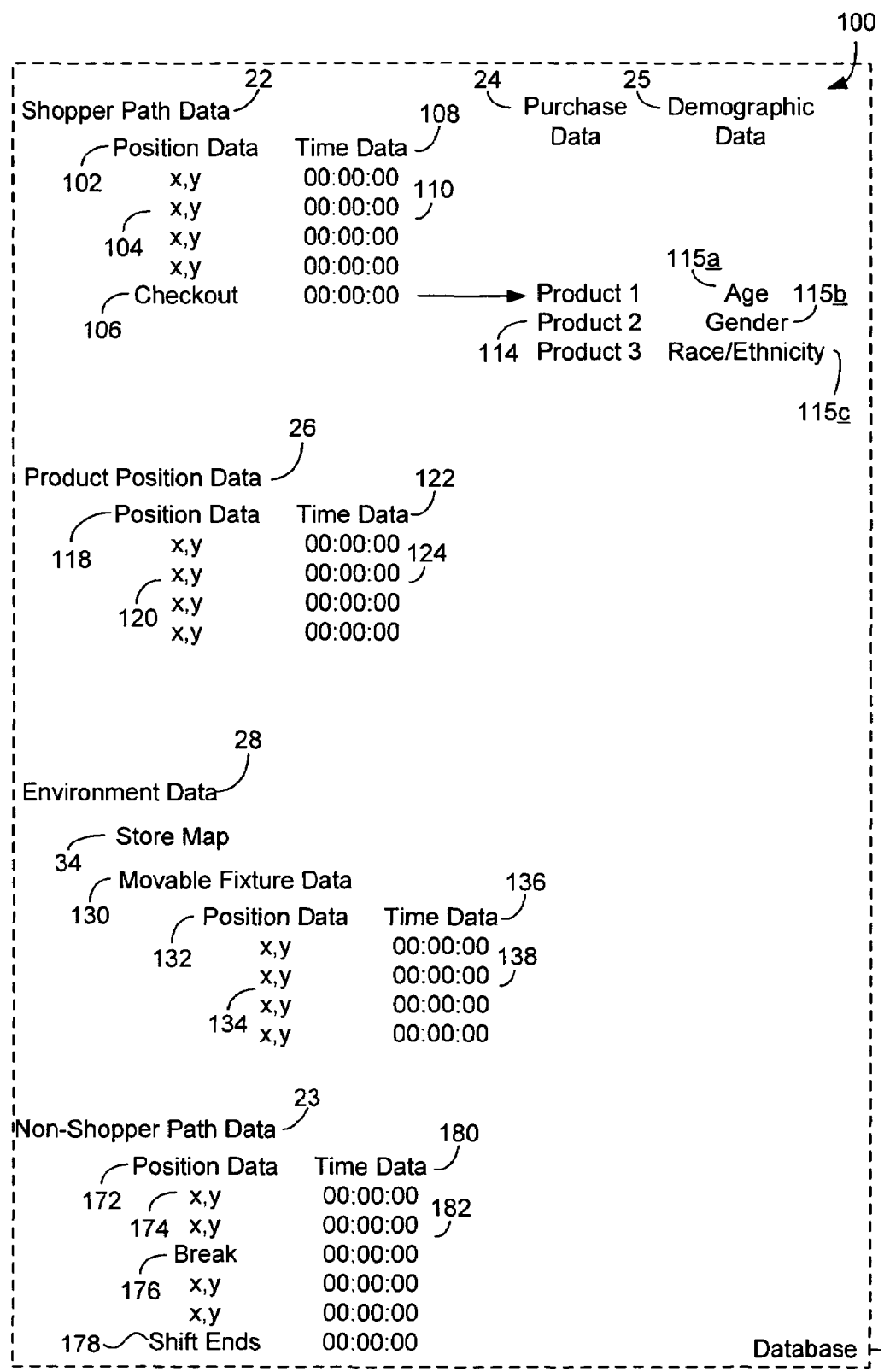
FIG. 6 is a schematic view of data utilized by the system of FIG. 1.

FIG. 6 shows a database record 100 including stored shopper path data 22, non-shopper path data 23, purchase data 24, product position data 26, and environment data 28, within database 18. Shopper path data 22 typically includes position data 102 including a series of shopping path positions 104 indicated by an array of coordinate pairs, with associated time data 108 including a series of corresponding time stamps 110 indicating the time at which each position was measured. Time data 108 may also include data indicating date and/or day of week data. A checkout flag 106 is also included indicating that the shopper proceeded to the checkout counter and entered into a purchase transaction.

Non-shopper path data 23 typically includes position data 172 including a series of non-shopper path positions 174 indicated by an array of coordinate pairs, with associated time data 180 including a series of corresponding time stamps 182 indicating the time at which each position was measured. Time data 186 may also include data indicating date and/or day of week data. A break flag 176 and/or shift end flag 178 may also be provided to indicate the time at which the non-shopper, typically a staff member, takes a break or ends his or her shift. These flags may be set, for example, by accessing time records in an associated employee work hours database. It will be understood that the term "non-shopper" is used herein to refer to staff members and other persons within shopping environment who are not shopping. Shoplifters are treated herein as being "shoppers" rather than "non-shoppers" since they typically are tracked using a shopper surrogate such as cart 88, or by infrared tracking or direct video observation, rather than a voluntarily worn staff surrogate, such as a name tag containing a radio transmitter.

Database record 100 may also include demographic data 25, such as shopper age 115a, shopper gender 115b, or shopper race 115c. Demographic data may be retrieved, for example, from affinity cards that are presented at the point of sale in shopping environment 14. Alternatively, where cameras are used to track shoppers, demographic data may be identified through observation of video data.

Purchase data 24 typically includes a list 114 of products purchased by the shopper, as indicated by purchase records from purchase records computer 38. As discussed above, the purchase records and shopper paths may be linked by coordinating the time and location of checkout in the shopper data and purchase data, or by scanning the shopper tag at the checkout, or by other suitable methods.

Product position data 26 typically includes position data 118 including a series of product positions 120 indicated by an array of coordinate pairs, with associated time data 122 including a series of corresponding time stamps 124 indicating the time, date, day of week, month, year, etc., at which each position was measured.

Environment data 28 typically includes a store map 34, as well as movable fixture data 130, which includes position data 132 including a series of movable fixture positions 134 indicated by an array of coordinate pairs, with associated time data 136 including a series of corresponding time stamps 138 indicating the time at which each position was measured.

Turning now to the normalizing functionality of system 10, normalization module 30 is configured to normalize shopping path data 22, non-shopping path data 23, and/or purchase data 24 using a predetermined normalization function. It will be appreciated that product position data 26 and/or environment data 28 may also be normalized according to the methods described herein, but for simplicity, only shopper path normalization will be described. Further, it should be understood that the various techniques described herein for normalization and calculation of statistics based on shopper path data may also be applied to non-shopper path data, but that for the sake of brevity will be discussed mainly in relation to shopper path data.

The predetermined normalization function may include, for example, time adjusting the shopping path data for each of a plurality of shopping paths to a common time reference, to thereby produce normalized time data for the shopper paths. This common reference may be a common starting time, or a common duration, for example. Thus, a plurality of shopping trips through one or more shopping environments may be time shifted to have a common starting time of zero, and time scaled to have a common duration of 1 hour, for example. The normalization function may also calibrate the normalized time data, for example, to 6 minute intervals within the hour, or other suitable calibration.

The predetermined normalization function may also include, for example, converting shopper path position data from a plurality of shopping environments into a common physical frame of reference, to thereby produce normalized position data for the shopper paths. This may be accomplished by, for example, by determining standardized shopping environment dimensions (provided within store map 34) and/or by determining standardized shopping environment sectors (provided by a sector map explained in connection with the discussion of FIGS. 14-15). Once determined, the position data may be scaled to the standardized dimensions and/or sectors.

For example, in a typical scenario the store entrance/exit with the most traffic is taken to define the front of the store. The store wall opposite the wall in which the entrance/exit lies is considered to be the back. The front wall and back wall of the shopping environment together define the longitudinal dimension of the shopping environment, with the front-back distance defining the store length. The right and left walls of the store are defined from the perspective of a shopper just entering the store from the front. The right wall and left wall of the shopping environment together define the lateral dimension of the shopping environment, with the right-left distance defining the store width.

Normalization module 30 may be configured to utilize store length and store width to express shopping paths from different stores in the common physical frame of reference. Typically, the common physical frame of reference is a percentage or other ratio of the actual length and width of each store. Thus, coordinates measured from each store are divided by the actual length and width of each store so that the coordinates may be expressed in the common frame of reference. For example, according to the common frame of reference, a position at the back of the store may be expressed as 100%, a position intermediate between the store front and the store back is expressed as a corresponding percent of store depth, and a position at the front wall may be expressed as 0% of the standardized length. Likewise, a position at the right wall of the store may be expressed as 100%, a position intermediate between the right wall and left wall of the store may be expressed as a corresponding percent, and a position near the left wall may be expressed as 0%. For example, the y-axes of FIGS. 7-8 indicate 0-100% depth and 0-100% right, respectively.

In addition, normalization module 30 may be configured to determine, for each position 94 of shopping path 92, the proportion (e.g. percentage) of trip completion corresponding to that position. Normalization module 30 may calculate this percentage based on cumulative distance traversed by shopping path 92 up to position 94. Alternatively, normalization module 30 may calculate this percentage based on cumulative time spent shopping from the beginning of shopping path 92 up to arriving at position 94. Either basis for calculating trip completion establishes a calibration for the shopping path, either with respect to distance traveled, or with respect to time elapsed. The percentage of trip completion is shown on the x-axis of the graphs in FIGS. 7-9, described below.

Figure 7:
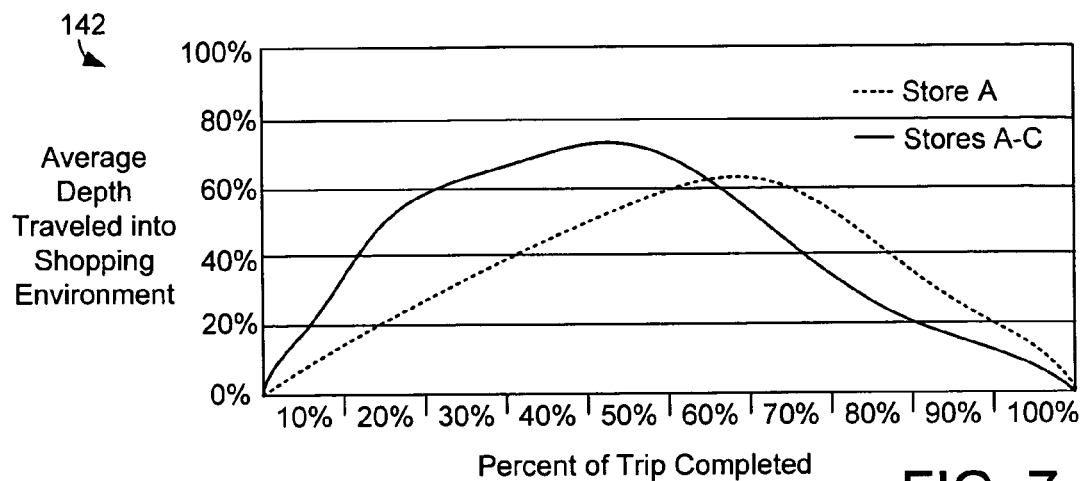
FIG. 7 is a graph output by the system of FIG. 1, showing an average depth traveled into the shopping environment by shoppers over the length of a shopping trip.

FIGS. 7-13 show representative output 20 produced by computing device 12 based on analysis of data received from shopping environments 14. FIG. 7 is a depth graph 142 comparing shopper behavior in shopping environment 14 of FIG. 4, the conventional shopping environment (indicated as Store A in the graph), with aggregate shopper behavior in a plurality of shopping environments (indicated as Store A-C in the graph). In graph 142, average shopping path depth, normalized to a common store length and expressed on a scale of zero to 100%, as described in the preceding paragraph, is plotted vs. percent of trip completed, normalized based on time or distance, as discussed above. The dotted curve depicts data obtained when the average is taken only over shopping paths in Shopping Environment A. The solid curve shows data averaged over all three shopping environments.

Figure 8:
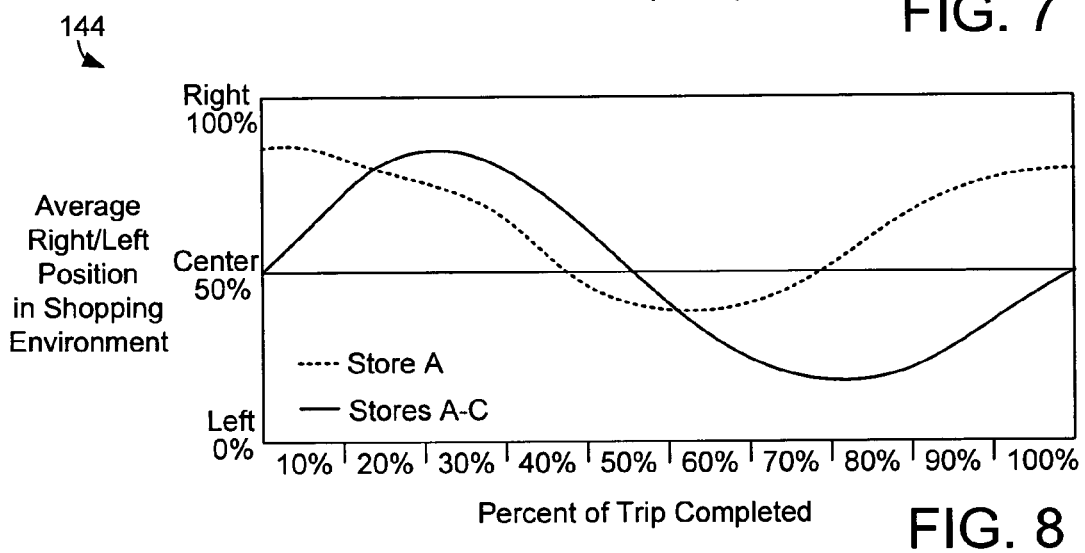
FIG. 8 is a graph output by the system of FIG. 1, showing an average lateral position of shoppers in the shopping environment over the length of a shopping trip.

FIG. 8 is a right-left position graph 144 comparing shopper behavior in shopping environment 14 of FIG. 4 (indicated as Store A in the graph), with aggregate shopper behavior in a plurality of shopping environments (indicated as Store A-C in the graph). In graph 144, an average right/left position of a plurality of shopping paths, normalized to store width, is plotted as a percentage vs. percent of trip completed. The dotted curve depicts data obtained when the average is taken only over shopping paths in Shopping Environment A. The solid curve shows data averaged over all three shopping environments.

Normalization module 30 is also configured to normalize product purchase data and compare the normalized product purchase data to normalized shopping path data. The product purchase data may be normalized, for example, by calculating the cumulative products purchased over an entire shopper path and expressing these on a common scale such as 0-100%, and then averaging the cumulative products purchased for a plurality of shopper paths, as shown on the y-axis of FIG. 9. The cumulative purchased products may be measured by number of products purchased, or total dollar value of products purchased, for example.

One manner in which the normalized product purchase data may be compared to the shopper path data is by comparing the percent of cumulative purchases vs. a percentage of the trip completed. Since database 18 contains product position data, comparison of shopping path positions with the positions of products purchased by a shopper during traversal of the shopping path make it possible to determine the order in which each product was selected for purchase. Using the cumulative purchase data, each shopping path position is thereby associated with a percentage of purchases selected. Thus, normalization module 30 may establish an additional calibration for the shopping path, a calibration with respect to purchases made.

Alternatively, a shopping path calibrated by normalization module 30 according to percent of trip completed may be partitioned into calibrated segments of equal trip completion percentage, for example, deciles. Next, cumulative product purchases may also be partitioned according to the path decile in which the product was selected for purchase. Thus, normalization module 30 may associate with each trip decile a percent of total purchases. Deciles with a greater percent of purchases represent greater "shopping intensity."

Figure 9:
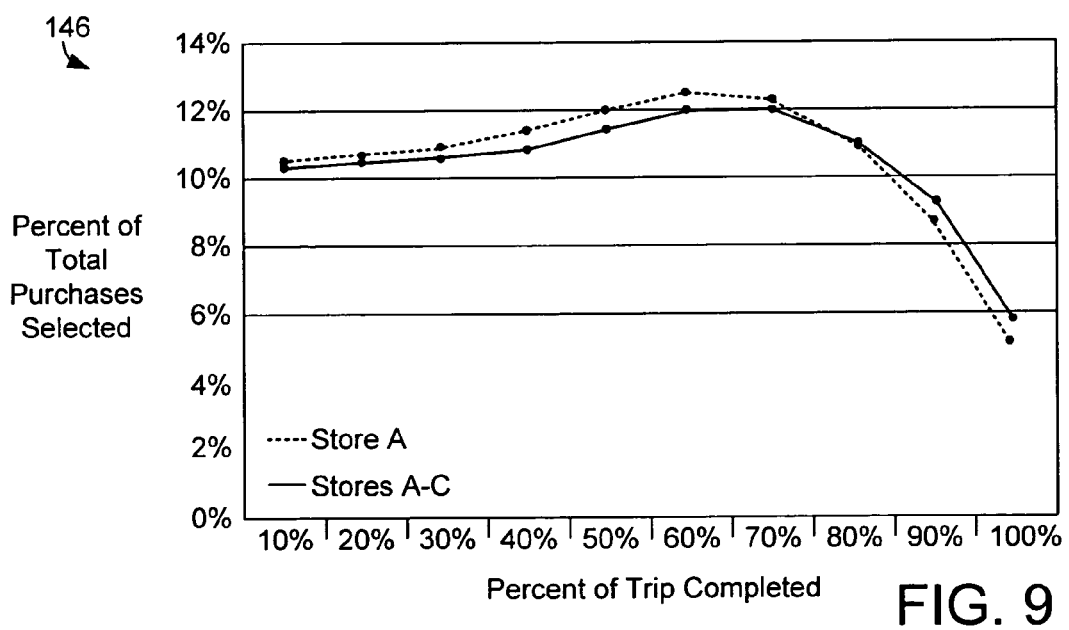
FIG. 9 is a graph output by the system of FIG. 1, showing the average percent of total purchases during each portion of a shopping trip.

An example of this is shown in FIG. 9, which is a shopping intensity graph 146 comparing shopper behavior in shopping environment 14 of FIG. 4 (indicated as Store A), with aggregate shopper behavior in a plurality of shopping environments (indicated as Stores A-C). The plot provides a measure of shopping intensity. In the graph, percent of total purchases selected, as discussed in the previous paragraph, is plotted vs. percent of trip completed. The dotted curve depicts data obtained when the average is taken only over shopping paths in Store A. The solid curve shows data averaged over all three shopping environments.

FIGS. 7-9 show that differences and similarities between a single shopping environment, and aggregate data from a plurality of shopping environments, can be readily compared using system 10. It will be appreciated that comparisons may also be made between a first shopping environment and a second shopping environment, between one set of shopping environments and another set of shopping environments, etc.

Figure 10:
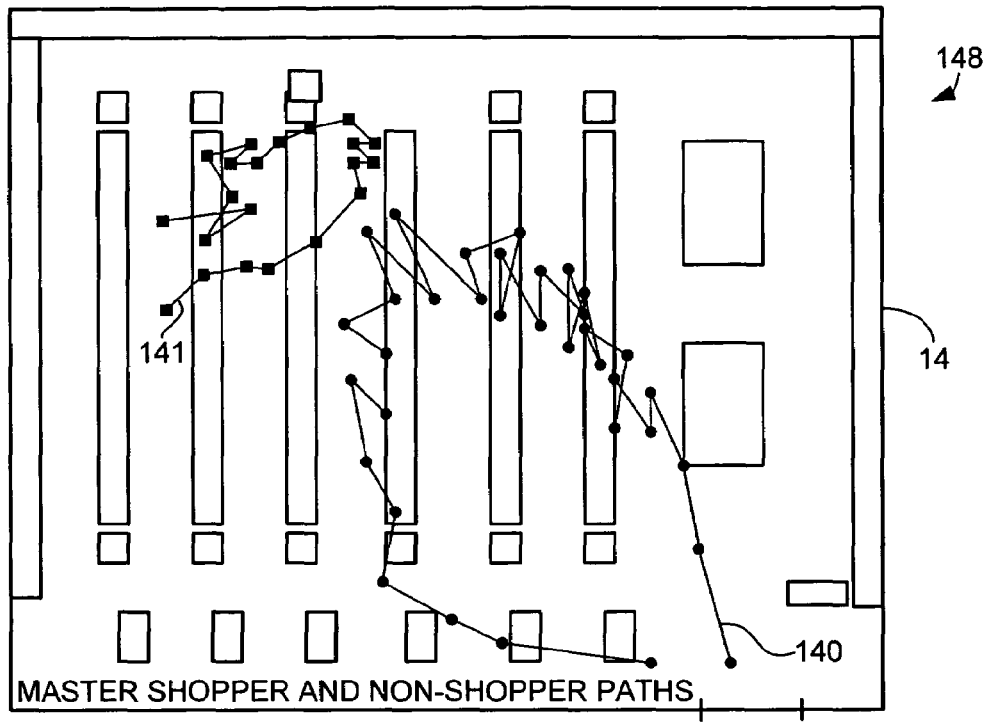
FIG. 10 is a schematic view of the shopping environment of FIG. 3, showing a master shopper path and master non-shopper path through the shopping environment.

Statistical calculation module 32 is typically configured to calculate a predetermined statistical measure based on the normalized shopping path data and/or normalized purchase data. Referring now to FIG. 10, the statistical calculation module 32 is typically configured to calculate a master shopper path 140 and/or a master non-shopper path 141 for one or more shopping environments, and produce a master shopper path graph 148. To produce graph 148, the time data for each shopper path and non-shopper path in a plurality of shopper paths is typically time shifted to a common starting point, and time scaled so that each path has the same duration. Corresponding points are chosen for each time-scaled path so as to divide each time scaled path into segments of the same duration, e.g., 10% of the total duration, 20% of the total duration, and so on. An average x-coordinate is then determined for each of the sets of corresponding points by averaging their x-coordinates. A similar procedure yields an average y-coordinate. The pairs of average x, y coordinates for corresponding points chosen in order to define the averaging procedure provide an additional measure of average shopper behavior in the shopping environment. By comparing the master paths for shoppers vs. non-shoppers (e.g., staff) retailers may ascertain where staff may be more effectively positioned to help shoppers within the shopping environment. It will also be appreciated that tags for non-shoppers may be divided into a plurality of groups, so that master paths may be produced for each group. For example, a master path for garden department staff members may be produced.

Figure 11:
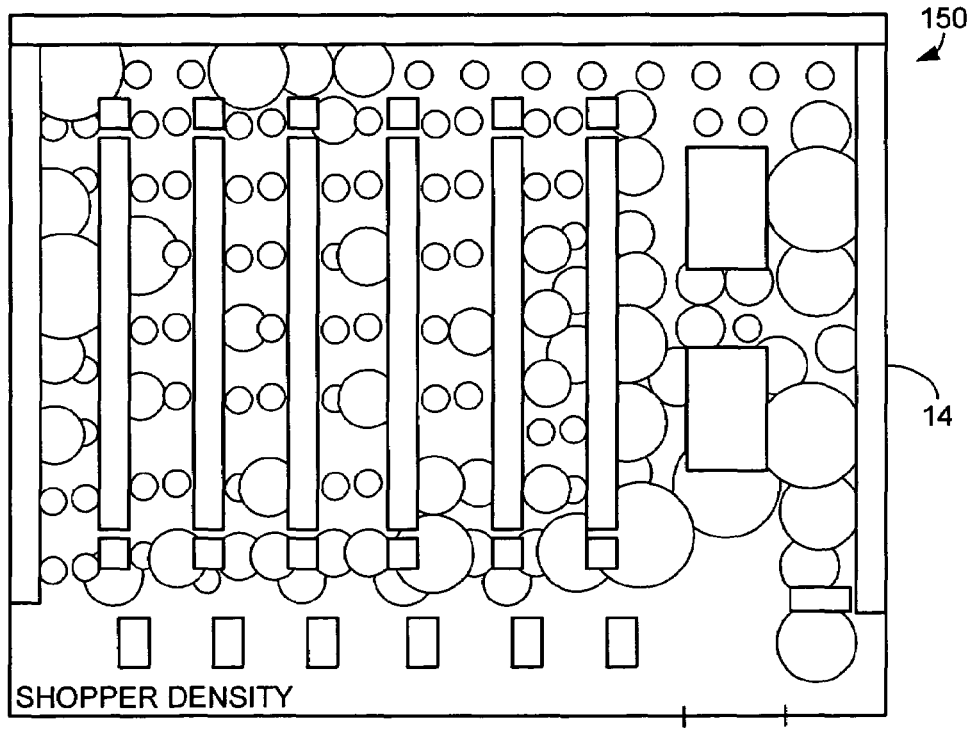
FIG. 11 is a schematic view of the shopping environment of FIG. 3, showing a shopper density throughout the shopping environment.

As shown in FIG. 11, the statistical calculation module is also typically configured to calculate a shopper density measure for at least a portion of a shopping environment, and output a shopper density graph 150 showing the results. The density measure may be calculated from a plurality of shopper paths from one shopping environment, or based on normalized shopper position data from a plurality of shopper environments. The shopping environment is typically resolved into regions of equal area, for example, by means of a rectangular or square grid. The number of shopper path positions falling into a particular region is counted as a measure of shopper density, the counting to include every shopper path in the plurality. In FIG. 11, circles of larger radius represent higher counts of shoppers per unit time, thus larger values of shopper density. If desired, multiple density graphs may be produced, showing the change in shopper density over time. It will also be appreciated that non-shopper density may be calculated and graphed, and that a difference measure between the shopper density and non-shopper density may also be calculated and graphed. This difference may expose areas in which staff are insufficiently allocated to help shoppers, for example. Of course, density may be measured for only a predetermined subgroup of shoppers or non-shoppers. For example, density of garden department staff may be measured against those shoppers who are shopping with specially sized garden department carts. Thus, it will be appreciated that a plurality of groups of shopper and non-shopper tags may be defined and statistics calculated separately for each.

Figure 12:
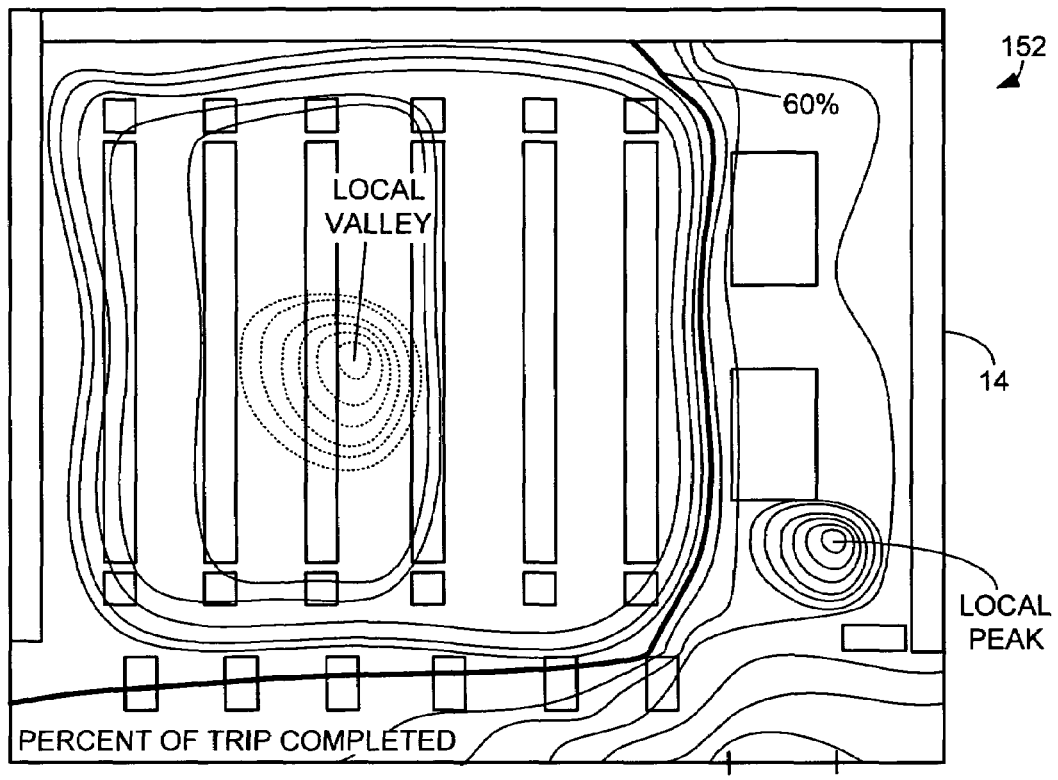
FIG. 12 is a schematic view of the shopping environment of FIG. 3, showing an exemplary contour plot of percentage of trip completion for shopping paths throughout the shopping environment.

As shown in FIG. 12, the statistical calculation module is also configured to calculate shopping intensity for at least a portion of a shopping environment, and output a contour graph 152 showing the results. The shopping intensity measure may be calculated from data from one shopping environment, or a plurality of shopper environments. FIG. 12 shows a contour plot of percent of trip completed superimposed on a store map. Referring back to FIG. 9, shopping intensity, that is, percent of total purchases selected, is plotted in that Figure against percent of trip completed. Shopping intensity for Store A peaked when 60% of the trip was completed. The contour for 60% in FIG. 12 shows where shoppers are when their purchasing, on average, is most intense. This is valuable information for retailers since it shows in what regions of the shopping environment product placement and in-store displays may be most effective. In addition, local valleys and local peaks can show retailers where purchasing activity in a region of the store is, on average, more or less intense.

Figure 13:
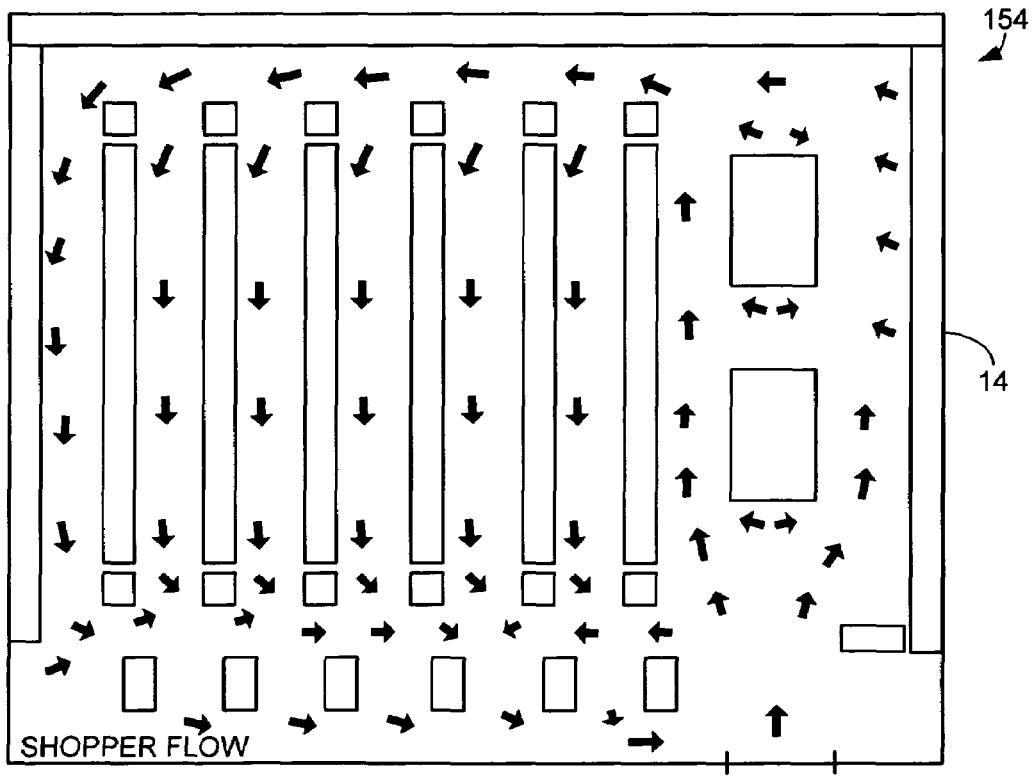
FIG. 13 is a schematic view of the shopping environment of FIG. 3, showing average flow of a plurality of shoppers, at different regions of the shopping environment.

Referring now to FIG. 13, shopping path data may be analyzed by statistical calculation module 32 to derive a shopper velocity for each measured position along a shopper path, and produce a shopper flow graph 154. The shopper velocity data may be averaged over a plurality of shopper paths similar to the manner in which average shopper density may be calculated, by resolving the shopping environment into regions of equal area. Summing the velocities for shopper path points falling in a certain area, then dividing by the number of shopper path points falling in that area, defines an average velocity. In a similar way, an average pair of x-y coordinates may be determined for each region. The average velocity information so obtained may then be superimposed on a store map to provide a picture of shopper movement, in terms of location, direction and speed, through a shopping environment.

As discussed previously in connection with FIG. 9, database 18 contains product position data 26 as well as shopping path position data 102. Analysis program 16 may compare shopping path positions with positions of products purchased by a shopper during traversal of the shopping path. Database 18 also contains time data 108 including time stamps 110 for each shopping path position. Analysis program 16 may use time stamps 110 to evaluate how long it takes the shopper to select each product purchased by the shopper, i.e., how long each purchase takes to make, during traversal of the shopping path.

Statistical calculation module 32 may also utilize time data 108, including time-of-day, day-of-the-week, week, month, and year, to calculate a predetermined statistical measure such as described above, incorporating the time data. Statistical calculation module 32 may also utilize demographic data 25, such as age 115*a*, gender 115*b*, and race 115*c*, to calculate a predetermined statistical measure such as described above, incorporating demographic data 25.

Figure 14:
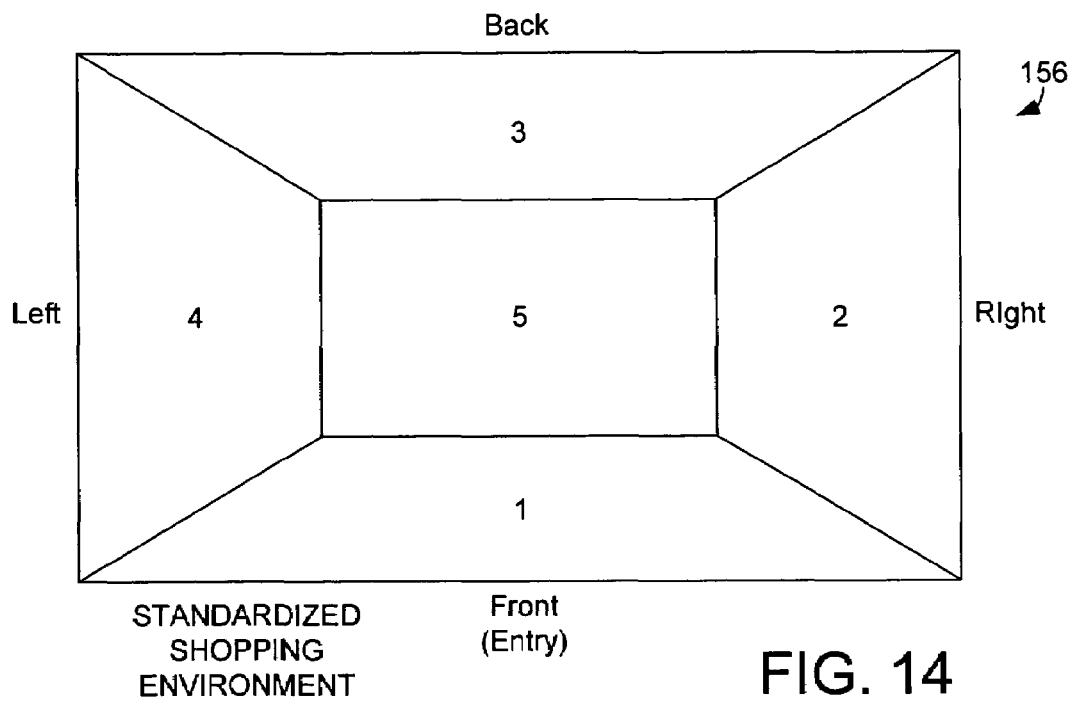
FIG. 14 is a standardized shopping environment utilized by the system of FIG. 1 to compare shopping environments of varying dimensions.

FIG. 14 shows a standardized shopping environment 156 utilized by the system of FIG. 1 to compare shopping environments of varying dimensions. The standardized shopping environment is typically divided into a plurality of sectors representing different sectors of each shopping environment. For example, the shopping environment may be divided into 4 quadrants, 5 sectors including edge quadrants plus a center core, etc.

By convention, the wall of the shopping environment containing the entry with the highest traffic is typically considered the front. Once this convention has been adopted, the back, and left and right sides, are determined. The standardized environment is typically defined by separating the shopping environment into five sectors of equal area. The first four areas run counterclockwise around the shopping environment beginning at the front. The fifth region consists of the center of the shopping environment. The fifth region has sides parallel to the sides, front, and back of the shopping environment. The other sectors are trapezoidal with sloping sides coincident with segments of the diagonals bisecting the shopping environment. Although 5 sectors are shown, it will be appreciated that virtually any number and configuration suitable for describing the shopping environments may be used.

The present system is configured to detect various shopping behaviors, such as visiting, shopping, and purchasing products, as well as conversions between visiting and shopping, and shopping and purchasing in a particular predefined region 65 of the shopping environment. These behaviors are described in detail in prior co-pending application U.S. patent application Ser. No. 10/115,186, entitled "PURCHASE SELECTION BEHAVIOR ANALYSIS SYSTEM AND METHOD," filed on Apr. 1, 2002, the disclosure of which is incorporated by reference.

A visit to a region of the shopping environment takes place whenever the shopping path intersects the region. Thus, for example, for stores with one entrance, all shoppers visit the store entrance. The behavior of shopping is considered to take place in a region of the shopping environment whenever the velocity of the shopping path falls below a predetermined threshold speed, for example, 1 foot/second, while the shopping path intersects the region. The actual value of the threshold speed may vary from one shopping environment to another, depending on store layout, the amount of store traffic, and other factors.

A shopping path is considered to show purchasing behavior in a region of the shopping environment when it is determined that the shopper has selected an item in the region for purchase, and the shopping path has intersected that region. Note that a purchase is typically not determined to have taken place until the actual purchase transaction at a checkout register 98 is recorded by purchase records computer 38.

Statistics calculation module 32 is typically configured to examine one or more shopper paths from one or more of the shopping environments to determine a measure of one or more of the predetermined shopping behaviors (visit, shop, purchase, etc.) occurring in each of the sectors.

As shown in FIG. 16, the result may be tabulated in a table 164 utilizing the framework provided by the standardized shopping environment of FIG. 14. Table 164 is designed to include data from four different shopping environments, namely, a conventional store in a strip, a drive aisle store in a strip, a conventional store in a mall, and a drive aisle store in a mall. Data from each shopping environment consists of 500 shopping paths and associated purchase records.

As shown in the table, and previously mentioned, all shoppers visit the front of the store, where the stores have only one entrance, as in this example. This is tabulated by the entries of 100% in the first row of the table under "VISITS" in FIG. 16. Other entries in the table typically show the percentage of shoppers to visit, shop, or purchase in each of the five sectors of the four different shopping environments, although these values are represented as "XX" in the Figure.

This example may show that location and store layout can affect shopper behavior. For example, in a drive aisle environment, shoppers may be more likely to visit the back wall of the store than in a conventional store.

Figure 15:
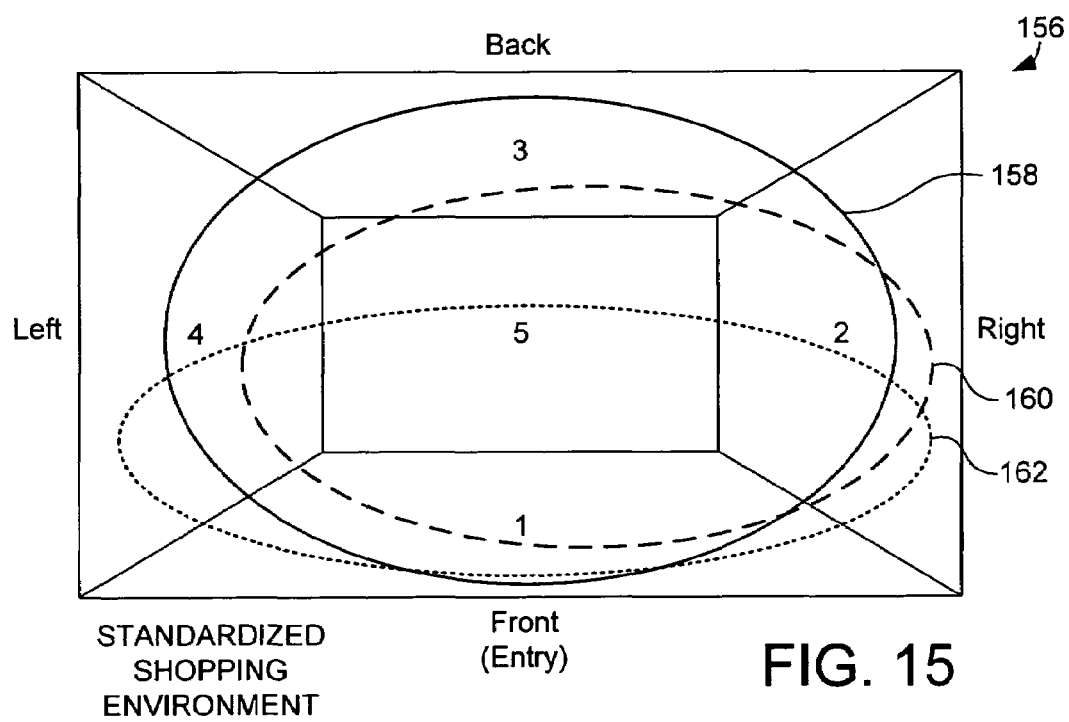
FIG. 15 is the standardized shopping environment of FIG. 14, with ellipses superimposed over areas covering a predetermined percentage occurrence of a selected shopper behavior, such as visiting, shopping, or purchasing a product in the shopping environment.

Turning now to FIG. 15, statistics calculation module 32 is typically configured to produce a graph based on the sector-by-sector analysis of shopping behaviors such as visit, shop, and purchase. Statistics calculation module 32 may be configured to determine a best-fit ellipse to encompass a predetermined percentage (e.g., 80%) of the predetermined shopping behavior. Thus, ellipse 158 represents a best fit ellipse encompassing the predetermined percentage of detected visiting behavior, ellipse 160 represents a best fit ellipse encompassing the predetermined percentage of detected shopping behavior, and ellipse 160 represents a best fit ellipse encompassing the predetermined percentage of detected purchasing behavior. From the different shapes of the ellipses, it can be determined that shoppers widely visit the store, slow down and shop towards the middle-front of the store, and concentrate purchasing activity to the front of the store. It will be understood that percentages other than 80% may be used, and in addition other suitable geometric representations besides ellipses may be used. Further, while the ellipses are typically superimposed on the standardized shopping environment for normalized data from a plurality of shopping environments, it will be appreciated that the ellipses may be plotted directly on a map of the shopping environment 14, where data is only taken from one store, for example.

Further, path data for shoplifters tracked through the shopping environment may also be normalized and represented according to standardized shopping environment, and an ellipse or other geometric representation may be created to encompass a predetermined percentage of visit, pause, or steal behavior exhibited by shoplifters. The determination that a product has been stolen may be made by analysis of video data, product tags traveling out of shopping environment 14 without being scanned, etc.

In addition, non-shopper data from a plurality of shopping environments may be normalized and represented according to standardized shopping environment 156, and a best fit ellipse or other geometric representation may be positioned around the non-shopper data exhibiting a selected behavior. Behaviors for non-shoppers may include working, taking a break, or may be classified by types of work, such as working checkout, stocking products, fielding carts, assisting customers, etc. These behaviors may be determined based on analysis of employee time records, position of non-shopper (e.g. next to check out, storeroom, etc.), etc.

Various other graphs may be produced in addition to the graphs shown in the Figures. For example, the statistical calculation module may be configured to calculate an average distance between non-shoppers (e.g., staff) and shoppers over a predetermined period of time. This may be calculated for an entire store, or for each of a plurality of regions of a store, and graphed. Average distance and direction between shoppers and non-shoppers may also be calculated and represented as a vector field, similar in appearance to the flow graph in FIG. 13. One useful measure that the statistical calculation module may be configured to calculate is the average distance between staff and the shopper at the time of purchase of a product. To calculate this, the statistical calculation module is typically configured to identify purchase behavior at particular locations and times based on shopper data 22 and purchase data 24, and then calculate an average distance to staff member based on non-shopper data 23.

Figure 17:
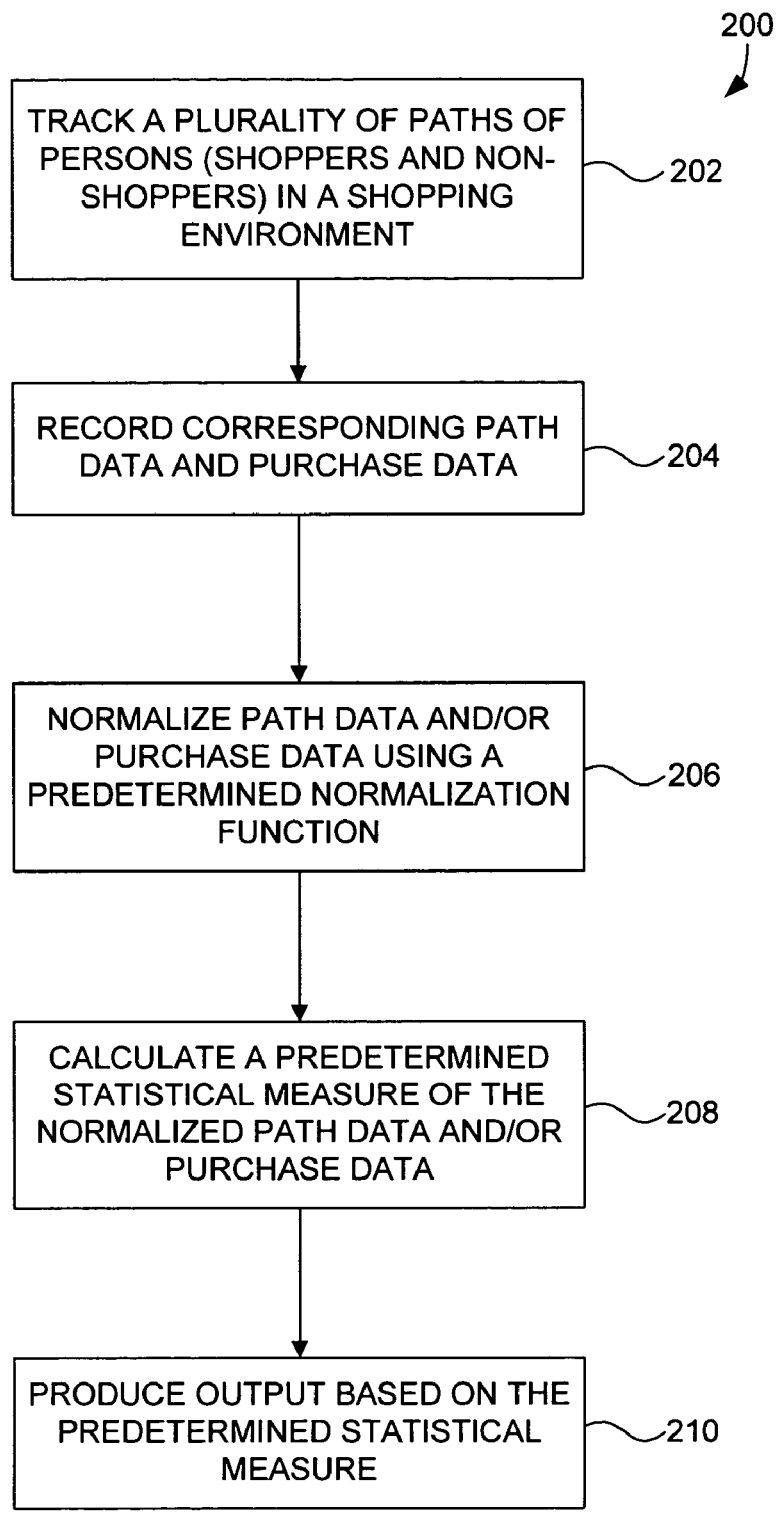
FIG. 17 is a flowchart of a method according to one embodiment of the present invention.

Turning now to FIG. 17, a method for analyzing shopping behavior of persons in a shopping environment, according to one embodiment of the invention is shown generally at 200. The persons measured may be shoppers and/or non shoppers, as discussed above. Method 200 typically includes, at 202, tracking a plurality of paths of persons in the shopping environment. At 204, the method typically includes recording corresponding path data. Typically, the path data includes position data representing a series of tracked positions of a person in the shopping environment, and associated time data representing a corresponding series of times at which the person was tracked in each position. The path data may be, for example, shopper path data, or non-shopper path data. The method may also include recording time data such as time-of-day, day-of-the-week, week, month, and year, and may in addition include recording demographic data such as age, gender, and race.

At 206, the method typically includes normalizing path data for each path by use of a predetermined normalization function. At 208, the method typically includes calculating a predetermined statistical measure of the normalized path data. At 210, the method typically includes producing output based upon the predetermined statistical measure.

Figure 18:
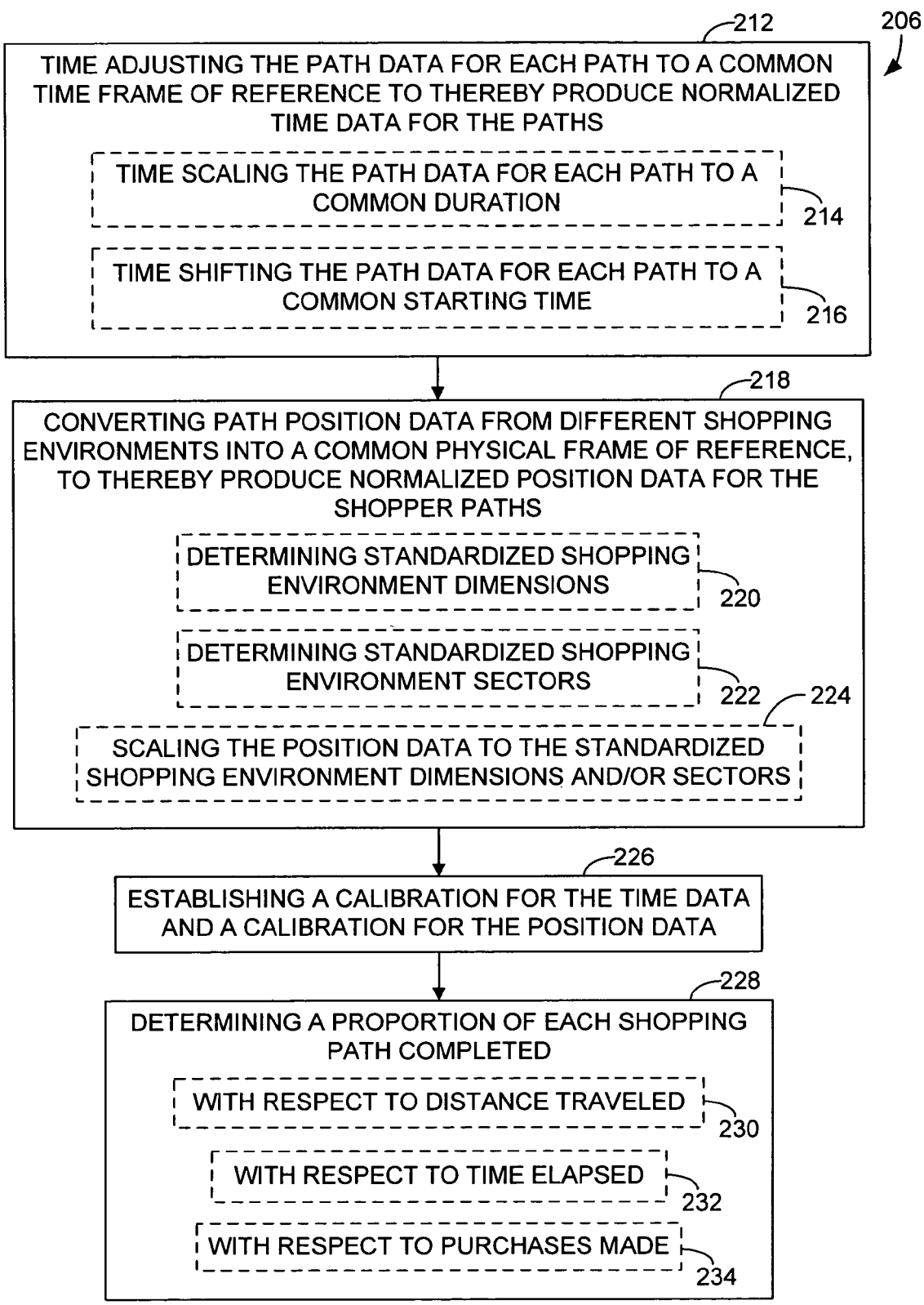
FIG. 18 is a flowchart showing details of the step of normalizing of FIG. 17.

Turning now to FIG. 18, exemplary sub-steps in the step 206 of normalizing are shown in detail. As shown at 212, the step of normalizing typically includes time adjusting the time data for each path to a common time reference, to thereby produce normalized time data for the paths. The step of time adjusting may include time scaling the path data for each shopping path to a common duration, as shown at 214, and/or time shifting the path data for each path to a common starting time, as shown at 216.

At 218, the method further includes converting path position data from different shopping environments into a common physical frame of reference, to thereby produce normalized position data for the paths. This may be accomplished in part by determining standardized shopping environment dimensions, as shown at 220, and/or by determining standardized shopping environment sectors, as shown at 222. In addition, as shown at 224, the method may include scaling the position data to the standardized shopping environment dimensions and/or sectors.

At 226, the method further includes establishing a calibration for the time data and a calibration for the position data. FIG. 7 shows exemplary calibrations, namely, time data calibration into deciles from 10% to 100% for percentage of trip completion, and position data calibration into a scale of 0-100% depth into the shopping environment.

At 228, the method further includes determining a proportion of each path completed. As shown at 230-234, the determination may be made with respect to distance traveled, time elapsed, or purchases made, as discussed above.

Figure 19:
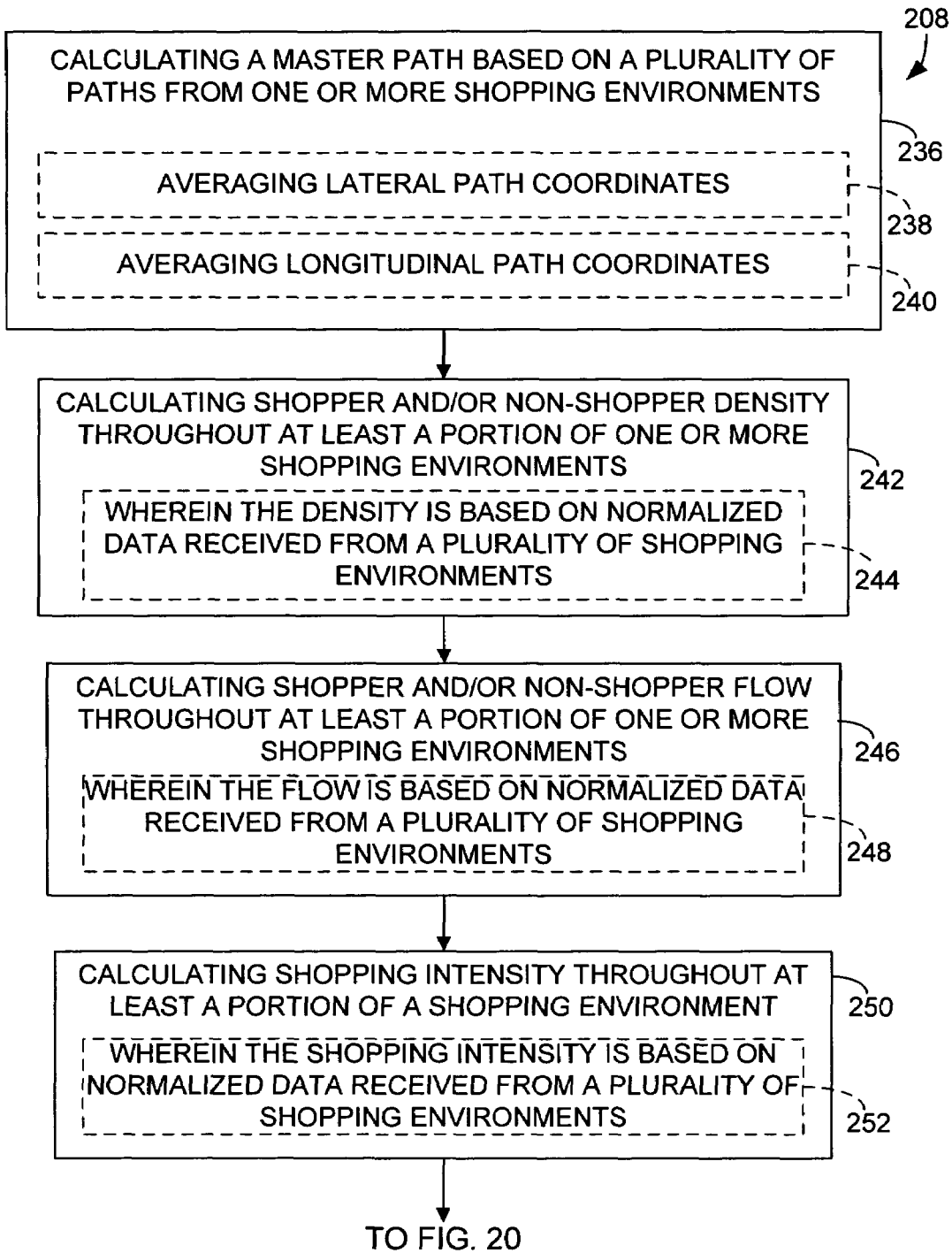
FIG. 19 is a flowchart showing details of the step of calculating a statistical measure, of FIG. 17.

Turning now to FIG. 19, exemplary sub steps in the step 208 of calculating a statistical measure are shown in detail. At 236, the method may include calculating a master path based on a plurality of shopping paths or non-shopping paths from one or more shopping environments. Typically the master path is an average shopping path calculated by averaging lateral shopping path coordinates, as shown at 238, and averaging longitudinal shopping path coordinates. A graph of such a master shopper path and master non-shopper path is shown in FIG. 10, described above. While typically steps 238 and 240 may be performed together to arrive at the paths of the type shown in FIG. 10, it will be appreciated that steps 238 and 240 may be performed in the alternative to produce average right-left position and average depth graphs, respectively.

At 242, the method typically includes calculating a density of tracked persons throughout at least a portion of a shopping environment. As discussed above, both shopper density and non-shopper density may be calculated, as well as a difference between the two. The difference between the shopper density and non-shopper density may identify areas in which additional staff members are needed, for example. As shown at 244, the density may be based on normalized data received from a plurality of shopping environments. The density may be represented in a variety of forms, including circles of varying size, as shown in FIG. 11.

At 246, the method typically includes calculating a flow of persons throughout at least a portion of a shopping environment. Typically, the flow is represented as a series of velocity vectors, as described above with reference to FIG. 13. As shown at 248, the flow may be based on normalized data received from a plurality of shopping environments. Flow of shoppers and/or non-shoppers may be tracked.

At 250, the method typically includes calculating a shopping intensity throughout at least a portion of a shopping environment. The shopping intensity may be represented in various forms, such as line graph, contour plot, etc., as described above with reference to FIGS. 9 and 12. As shown at 252, the shopping intensity may be based on normalized data received from a plurality of shopping environments.

Figure 20:
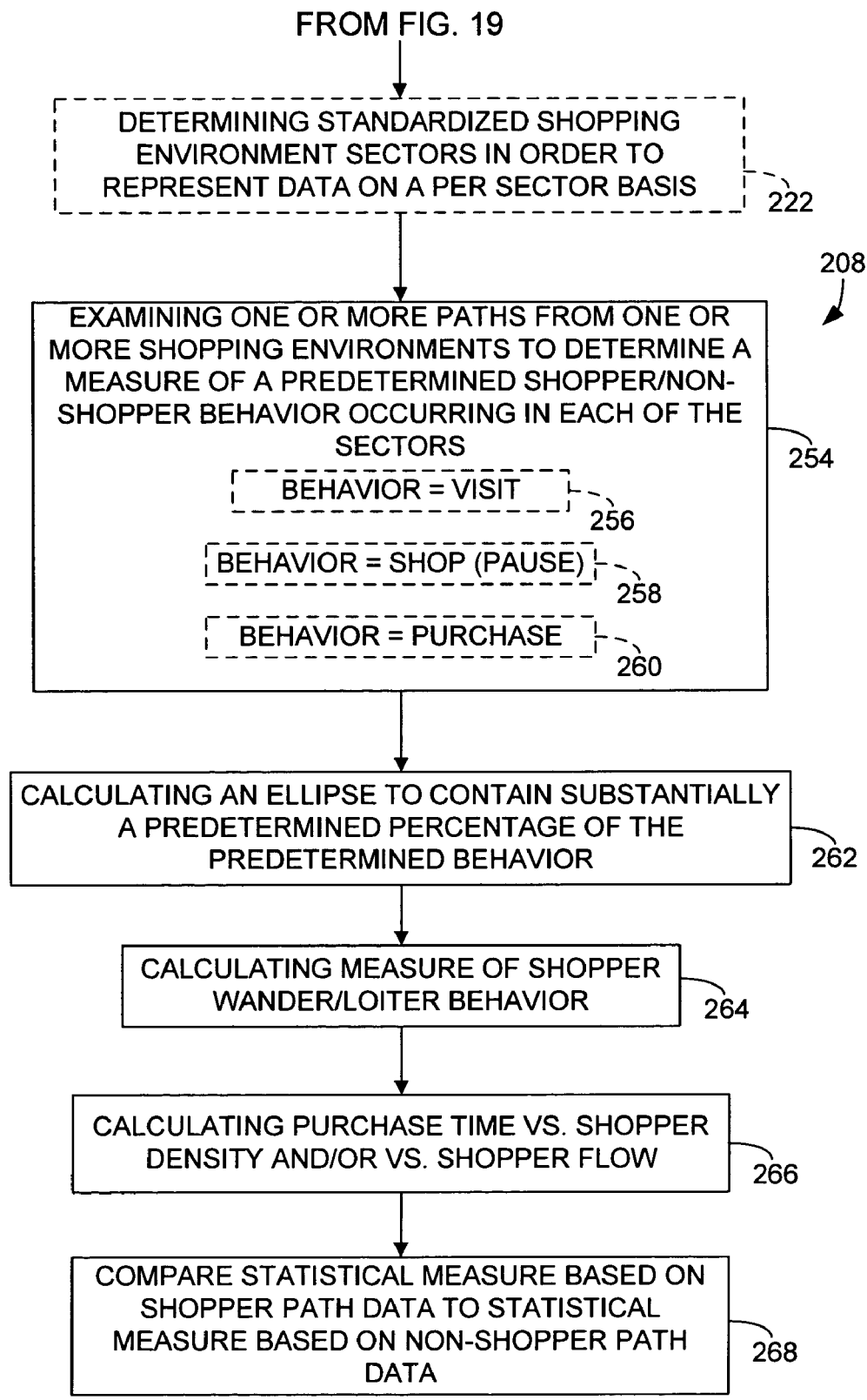
FIG. 20 is a flowchart continuing from the flowchart of FIG. 19.

Turning now to FIG. 20, as discussed previously in step 222 the method may include determining standardized shopping environment sectors in order to represent data on a per sector basis, as shown and discussed with respect to FIGS. 14-16. At 254, the method may include examining one or more paths from one or more shopping environments to determine a measure of a predetermined shopping behavior and/or non-shopping behavior occurring in each of the sectors. As shown at 256-260 and described above in detail, the shopping behavior may be visiting, shopping (pausing), or purchasing a product in a predefined region (e.g. 65) corresponding with one of the sectors. The non-shopping behavior may be, for example, visiting, or performing some specific work task, in a predefined region corresponding to one of the sectors, as discussed above.

At 262, the method may include calculating an ellipse or other geometric representation to contain substantially a predetermined percentage of the shopping behavior and/or non-shopping behavior. At 264, the method may also include calculating a measure of shopper wander or loiter behavior. This is typically calculated by taking an actual shopping path, generating a smoothed shopping path, and dividing the length of the smoothed shopping path by the length of the actually measured shopping path. The resulting percentage is termed "purposeful travel," and the difference between 100% and the purposeful travel percentage is defined to be the percentage of wander loiter.

Any of various smoothing techniques may be used. For example, for each x-y pair in an actual trip, a new smoothed x and smoothed y, as follows:

$$X_{smoothed} = (X_{-2} + X_{-1} + X + X_{+1} + X_{+2})$$

$$Y_{smoothed} = (Y_{-2} + Y_{-1} + Y + Y_{+1} + Y_{+2})$$

Finally, at 266, the method may include calculating a purchase time vs. shopper density and/or vs. shopper flow.

As discussed above, it will be appreciated that the systems and methods described herein may used to track and analyze both shopper path data and non-shopper path data, and various comparisons may be made between shopper path data and non-shopper path data. Thus, as shown at 268, the method may further include comparing a statistical measure based on shopper path data to a statistical measure based on non-shopper path data.

The various embodiments of the present invention may be used to analyze shopping behavior with one or more disparate shopping environments, to provide useful information on shopping behavior within these environments to retailers, manufacturers, etc.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

I claim:

1. A computer-implemented method comprising analyzing shopper data from a plurality of different shopping environments having different sizes and shapes by:
   tracking a plurality of paths of a plurality of persons in each of the plurality of shopping environments, via a shopper tracking module executed on a computing device and an associated tracking system installed in each shopping environment;
   recording corresponding path data indicating the plurality of paths from the different shopping environments, in a database associated with the computing device, wherein the path data for each path includes position data representing a series of tracked positions of a person in the shopping environment, and associated time data representing a corresponding series of times at which the person was tracked in each position;
   normalizing the path data for each path by use of a predetermined normalization function to convert path position data from the different shopping environments into a common physical frame of reference, thereby producing normalized position data for the paths from the different shopping environments, by a normalization module executed on the computing device, wherein normalizing further includes determining a standardized shopping environment including sectors and/or standardized shopping environment dimensions, and converting the path data from each of the plurality of shopping environments to the standardized shopping environment by scaling the path position data to the standardized shopping environment dimensions and/or sectors;
   calculating a predetermined statistical measure of a predetermined shopper behavior or non-shopper behavior from the normalized path data, by a statistical calculation module executed on the computing device, wherein calculating includes examining normalized path data of one or more paths from each of the shopping environments to determine the predetermined statistical measure; and
   producing an output indicating the predetermined statistical measure of the shopper behavior or the non-shopper behavior calculated from the normalized path data from the plurality of shopping environments, by the computing device.

2. The method of claim 1, wherein the step of normalizing includes time adjusting the time data for each path to a common time reference.

3. The method of claim 2, wherein the step of time adjusting further includes the step of time shifting the time data for each path to a common starting time.

4. The method of claim 2, wherein the step of time adjusting further includes the step of time scaling the time data for each path to a common duration.

5. The method of claim 1, wherein each of the plurality of shopping environments has a longitudinal dimension and a length, a lateral dimension and a width, and the position data for each path includes a plurality of longitudinal and lateral coordinate values, and the step of converting the position data to a standardized frame of reference further includes dividing each longitudinal coordinate value by the length for the corresponding shopping environment, and dividing each lateral coordinate value by the width for the corresponding shopping environment.

6. The method of claim 1, further comprising establishing a calibration for the time data and a calibration for the position data.

7. The method of claim 1, wherein the predetermined normalization function includes determining a proportion of the path completed.

8. The method of claim 7, wherein the proportion is calculated with respect to a distance traveled by the person along the path.

9. The method of claim 7, wherein the proportion is calculated with respect to a time elapsed while the person traveled the path.

10. The method of claim 7, wherein the proportion is calculated with respect to cumulative purchases made while the person traveled the path.

11. The method of claim 1, wherein the step of calculating includes calculating a master path based on a plurality of the paths tracked in the shopping environment.

12. The method of claim 11, wherein the shopping environment has a longitudinal dimension, and each path has a plurality of longitudinal coordinate values, and wherein the calculation of the master path includes averaging longitudinal coordinate values of corresponding points of each path to obtain corresponding average longitudinal coordinate values.

13. The method of claim 11, wherein the shopping environment has a lateral dimension, and each path has a plurality of lateral coordinate values, and wherein the calculation of the master path includes averaging lateral coordinate values of corresponding points of each shopping path to obtain corresponding average lateral coordinate values.

14. The method of claim 1, wherein the step of calculating includes calculating density of a plurality of persons tracked throughout at least a portion of one or more shopping environments.

15. The method of claim 14, wherein the density is based on normalized data received from a plurality of shopping environments.

16. The method of claim 1, wherein the step of calculating includes calculating flow of a plurality of persons traveling throughout at least a portion of one or more shopping environments.

17. The method of claim 16, wherein the flow is based on normalized data received from a plurality of shopping environments.

18. The method of claim 16, wherein the shopping environment has a longitudinal dimension and a lateral dimension, and each shopping path has a plurality of longitudinal coordinate values and a plurality of lateral coordinate values, and wherein the step of calculating further includes, for each shopping path, associating with each selected time a velocity.

19. The method of claim 1, wherein the step of calculating includes calculating shopping intensity of a plurality of shoppers traveling throughout at least a portion of a shopping environment.

20. The method of claim 19, wherein the shopping intensity is based on normalized product purchase data received from a plurality of shopping environments.

21. The method of claim 1, wherein the shopping environment is partitioned into five sectors.

22. The method of claim 21, wherein the shopping environment has four sides, four corners, and a center, four of the sectors are substantially trapezoidal in shape having two sloping sides and a longer and a shorter of two substantially parallel sides, and the remaining sector is substantially rectangular in shape and having four sides and a center, the sloping sides of the four substantially trapezoidal sectors coinciding with segments of diagonal lines from opposite corners of the shopping environment, the longer of the two substantially parallel sides of each substantially trapezoidal sector coinciding with a side of the shopping environment, and the shorter of the two substantially parallel sides of each substantially trapezoidal sector forming a side of the remaining, substantially rectangular, sector, with the center of the substantially rectangular sector coincident with the center of the shopping environment.

23. The method of claim 1, wherein the shopper behavior is visiting a predetermined region of the shopping environment corresponding to the sector of the standardized shopping environment.

24. The method of claim 1, wherein the shopper behavior is slowing below a predetermined threshold speed in a predetermined region of the shopping environment corresponding to the sector of the standardized shopping environment.

25. The method of claim 1, wherein the shopper behavior is purchasing a product from a predetermined region of the shopping environment corresponding to the sector of the standardized shopping environment.

26. The method of claim 1, wherein the non-shopper behavior is visiting a predetermined region of the shopping environment corresponding to the sector of the standardized shopping environment.

27. The method of claim 1, wherein the step of calculating a predetermined statistical measure further includes determining a best fit ellipse to encompass a predetermined percentage of the shopper behavior or non-shopper behavior.

28. The method of claim 1, wherein the predetermined statistical measure is percentage of trip completion.

29. The method of claim 28, wherein the output includes a contour plot of percentage of trip completion for a plurality of paths.

30. The method of claim 1, wherein the step of calculating further includes the steps of:
    calculating a length of the shopping path;
    smoothing the shopping path to obtain a smoothed path;
    calculating a length of the smoothed path; and
    comparing the length of the smoothed path with the length of the shopping path.

31. The method of claim 1, wherein the plurality of persons include a plurality of shoppers.

32. The method of claim 1, wherein the plurality of persons includes a plurality of non-shoppers.

33. The method of claim 1, wherein the plurality of persons includes shoppers and non-shoppers, and the step of calculating a statistical measure includes calculating a statistical measure based on shopper path data and non-shopper path data, the method further comprising, comparing the calculated statistical measures of the shoppers and non-shoppers.

34. A system for use in analyzing a shopping environment, the system comprising:
    a computing device including a processor and memory holding instructions executable by the processor, when executed by the processor, the instructions causing the computing device to receive path data corresponding to a plurality of persons tracked in a plurality of shopping environments of different shapes and sizes, the path data including position data and time data, the instructions including an analysis program having a normalization module and a statistical calculation module;
    wherein the normalization module is configured to convert the path data to a common time frame of reference and a common physical frame of reference, to thereby produce normalized path data based on the path data from the plurality of shopping environments of different shapes and sizes; and
    wherein the statistical calculation module is configured to calculate a predetermined statistical measure based on the normalized path data to be output by the computing device.

35. The system of claim 34, further comprising a shopper tracking module configured to receive shopper path data from a tracking system.

36. The system of claim 35, wherein the tracking system includes sensors configured to track shopper tags throughout each of the shopping environments, to thereby produce the shopper path data.

37. The system of claim 34, further comprising a non-shopper tracking module configured to receive non-shopper path data from a tracking system.

38. The system of claim 37, wherein the tracking system includes sensors configured to track non-shopper tags throughout each of the shopping environments, to thereby produce the non-shopper path data.

39. The system of claim 34, further comprising a product tracking module configured to receive product path data from a tracking system.

40. The system of claim 39, wherein the tracking system includes sensors configured to track product tags throughout each of the shopping environments, to thereby produce the product path data.

41. The system of claim 34, further comprising an environment tracking module configured to receive movable fixture path data from a tracking system.

42. The system of claim 41, wherein the tracking system includes sensors configured to track environment tags throughout each of the shopping environments, to thereby produce the movable fixture path data.

43. The system of claim 34, wherein the predetermined statistical measure is selected from the group consisting of average shopper depth, average shopper right-left position, average shopper path, average shopper density, average shopper velocity, shopping intensity, percent of trip completed, average non-shopper depth, average non-shopper right-left position, average non-shopper path, average non-shopper density, average non-shopper velocity.

* * * * *

UNITED STATES PATENT AND TRADEMARK OFFICE
CERTIFICATE OF CORRECTION

PATENT NO. : 7,606,728 B2  Page 1 of 1
APPLICATION NO. : 10/667213
DATED : October 20, 2009
INVENTOR(S) : Herb Sorensen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1678 days.

Signed and Sealed this

Twelfth Day of October, 2010

David J. Kappos
*Director of the United States Patent and Trademark Office*